US008719668B2

(12) United States Patent
Hashimoto et al.

(10) Patent No.: US 8,719,668 B2
(45) Date of Patent: May 6, 2014

(54) NON-VOLATILE STORAGE SYSTEM COMPENSATING PRIOR PROBABILITY FOR LOW-DENSITY PARITY CHECK CODES

(75) Inventors: Akiyoshi Hashimoto, Kawasaki (JP); Akifumi Suzuki, Yokohama (JP); Takashi Tsunehiro, Ebina (JP)

(73) Assignee: Hitachi, Ltd., Tokyo (JP)

( * ) Notice: Subject to any disclaimer, the term of this patent is extended or adjusted under 35 U.S.C. 154(b) by 83 days.

(21) Appl. No.: 13/321,462

(22) PCT Filed: Nov. 1, 2011

(86) PCT No.: PCT/JP2011/006109
§ 371 (c)(1),
(2), (4) Date: Nov. 18, 2011

(87) PCT Pub. No.: WO2013/065085
PCT Pub. Date: May 10, 2013

(65) Prior Publication Data
US 2013/0111299 A1    May 2, 2013

(51) Int. Cl.
*H03M 13/00* (2006.01)
*G11C 29/00* (2006.01)
*G06F 11/00* (2006.01)

(52) U.S. Cl.
USPC .......................................... 714/770; 714/800

(58) Field of Classification Search
USPC .......... 714/763, 770, 773, 807, 746, 800–801
See application file for complete search history.

(56) References Cited

U.S. PATENT DOCUMENTS

| | | | |
|---|---|---|---|
| 7,656,707 B2 | 2/2010 | Kozlov | |
| 8,296,626 B2* | 10/2012 | Nazarian et al. | 714/763 |
| 2007/0245214 A1 | 10/2007 | Ramamoorthy | |
| 2008/0250270 A1 | 10/2008 | Bennett | |
| 2009/0006900 A1 | 1/2009 | Lastras-Montano et al. | |
| 2009/0154236 A1 | 6/2009 | Kozlov | |
| 2010/0122148 A1* | 5/2010 | Flynn et al. | 714/773 |
| 2010/0268985 A1 | 10/2010 | Larsen et al. | |
| 2010/0293440 A1 | 11/2010 | Thatcher et al. | |
| 2011/0185251 A1* | 7/2011 | d'Abreu et al. | 714/752 |
| 2011/0208897 A1* | 8/2011 | Lee et al. | 711/103 |

OTHER PUBLICATIONS

PCT Invitation to Pay Additional Fees and, Where Applicable, Protest Fee and Annex—Communication Relating to the Results of the Partial International Search on application PCT/JP2011/006109 mailed Apr. 17, 2012; 8 pages.

* cited by examiner

*Primary Examiner* — Shelly A Chase
(74) *Attorney, Agent, or Firm* — Foley & Lardner LLP

(57) ABSTRACT

Provided in one embodiment is a nonvolatile storage system having multiple nonvolatile storage media and a controller coupled to the multiple nonvolatile storage media. The controller has a storage area configured to store management information including probability management information denoting error probability information of a unit physical area in a nonvolatile storage medium, and an error correcting circuit configured to carry out coding and decoding by a low density parity check code. The controller, in a data read process, is configured to identify based on management information an error probability, uses the identified error probability to correct the read data using the error correcting circuit.

12 Claims, 21 Drawing Sheets

FIG. 2

| NONVOLATILE MEMORY NUMBER | BLOCK NUMBER | BIT ERROR PROBABILITY |
|---|---|---|
| 0x00000000 | 0x00000000 | $1.5 \times 10^{-4}$ |
| | 0x00000001 | $1.2 \times 10^{-4}$ |
| | ⋮ | ⋮ |
| 0x00000001 | 0x00000000 | $1.5 \times 10^{-4}$ |
| | 0x00000001 | $1.2 \times 10^{-4}$ |
| | ⋮ | ⋮ |
| ⋮ | ⋮ | ⋮ |

FIG. 5

| NONVOLATILE MEMORY NUMBER (505) | BLOCK NUMBER (501) | TIME AT WHICH DATA LAST PROGRAMMED (502) | PROPORTIONALITY FACTOR (503) | INTERCEPT (504) |
|---|---|---|---|---|
| 0x00000000 | 0x00000000 | 2011-06-15 16:34:20 | 0.04 | $2.0\times10^{-4}$ |
| | 0x00000001 | 2010-12-15 23:11:45 | 0.001 | $1.2\times10^{-4}$ |
| | ... | ... | ... | ... |
| 0x00000001 | 0x00000000 | 2011-06-15 16:34:20 | 0.04 | $2.0\times10^{-4}$ |
| | 0x00000001 | 2010-12-15 23:11:45 | 0.001 | $1.2\times10^{-4}$ |
| | ... | ... | ... | ... |
| ... | ... | ... | ... | ... |

BIT ERROR PROBABILITY TABLE (113, 901)

| TEMPERATURE (903) | NUMBER OF READS (904) | NUMBER OF ERASES (905) | NUMBER OF ELAPSED DAYS (906) | | | | |
|---|---|---|---|---|---|---|---|
| | | | 0 | 1 | 2 | 3 | ... |
| EQUAL TO OR LESS THAN 30°C | $1.0 \times 10^4$ | 100 | $p_{110}$ | $p_{111}$ | $p_{112}$ | $p_{113}$ | ... |
| | | 200 | $p_{210}$ | $p_{211}$ | $p_{212}$ | $p_{213}$ | ... |
| | | ⋮ | ⋮ | ⋮ | ⋮ | ⋮ | ⋱ |
| | $2.0 \times 10^4$ | 100 | $p_{120}$ | $p_{121}$ | $p_{122}$ | $p_{123}$ | ... |
| | | 200 | $p_{220}$ | $p_{221}$ | $p_{222}$ | $p_{223}$ | ... |
| | | ⋮ | ⋮ | ⋮ | ⋮ | ⋮ | ⋱ |
| | ⋮ | ⋮ | ⋮ | ⋮ | ⋮ | ⋮ | ⋮ |
| 31°C~40°C | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

BLOCK MANAGEMENT TABLE (902)

| NONVOLATILE MEMORY NUMBER (911) | BLOCK NUMBER (907) | NUMBER OF ERASES (908) | NUMBER OF READS (909) | TIME AT WHICH DATA LAST PROGRAMMED (910) |
|---|---|---|---|---|
| 0x00000000 | 0x00000000 | 54 | $2.5 \times 10^4$ | 2009-08-01 01:20:10 |
| | 0x00000001 | 12 | $7.8 \times 10^3$ | 2010-10-21 13:35:02 |
| ⋮ | ⋮ | ⋮ | ⋮ | ⋮ |

FIG. 13

| NONVOLATILE MEMORY NUMBER 1304 | BLOCK NUMBER 1301 | PAGE NUMBER REMAINDER 1302 | BIT ERROR PROBABILITY 1303 |
|---|---|---|---|
| 0x00000000 | 0x00000000 | 0 | $1.5 \times 10^{-4}$ |
| | | 1 | $1.2 \times 10^{-4}$ |
| | | ⋮ | ⋮ |
| | | $m-1$ | $2.5 \times 10^{-4}$ |
| | 0x00000001 | 0 | $3.0 \times 10^{-4}$ |
| | | 1 | $1.5 \times 10^{-4}$ |
| | | ⋮ | ⋮ |
| | | $m-1$ | $2.1 \times 10^{-4}$ |
| | ⋮ | ⋮ | ⋮ |
| ⋮ | ⋮ | ⋮ | ⋮ |

113

NON-VOLATILE STORAGE SYSTEM COMPENSATING PRIOR PROBABILITY FOR LOW-DENSITY PARITY CHECK CODES

TECHNICAL FIELD

The present invention relates to information storage systems which have error correction function by means of low-density parity check codes.

BACKGROUND ART

Efforts to increase the capacity of NAND-type flash memory (hereinafter called flash memory) have progressed in recent years, and flash memory has come to be used in place of a hard disk drive (hereinafter HDD) as a secondary storage system. For example, whereas the response time of the HDD is roughly 10 milliseconds, the response time of the flash memory, for example, is roughly between 100 microseconds and 2 milliseconds, making it extremely shorter than that of the HDD. The widespread use of flash memory as a storage medium in computers is due to the short response time.

However, realizing increased capacity in flash memory generally involves sacrificing reliability. Two problems exist with respect to reliability.

One problem relates to data retention characteristics. In a typical flash memory, data is stored, and when this data is read, there are between 40- and 50-bit errors per 512 bytes of data. Therefore, when storing data in a flash memory, error correcting codes (will be called ECC hereinafter) must be added for each 512 byte data so as to be able to correct the 40- to 50-bit errors with respect to 512-bytes of data.

One more problem is program-erase tolerance. Writing (called programming) and deleting (called erasing) data to and from the flash memory damages the flash memory cell that stores the data. When data is repeatedly programmed and erased, the flash memory cell completely breaks down and data can no longer be recorded in this cell. This signifies that the bit error probability of the flash memory rises when data is programmed/erased to/from the flash memory.

As described up to this point, in order to use flash memory as a secondary storage system in a computer, data must be encoded using ECC. There are numerous ECCs, but the ECC known for having high correction capabilities is a Low Density Parity Check Codes (called the LDPC codes hereinafter). The LDPC codes are an ECC that applies the Bayes theorem. The Bayes theorem will be explained here to explain the error correction principle of the LDPC codes.

It is supposed that the probability of an event A occurring is P(A). It is supposed that the conditional probability of an event B occurring after the event A has occurred is P(B|A). According to the definition of conditional probability, P(B|A) is given as math (1).

$$P(B \mid A) = \frac{P(A \cap B)}{P(A)} \quad [\text{Math. 1}]$$

Alternatively, the conditional probability P(A|B) of the event A occurring after the event B has occurred is given as math (2).

$$P(A \mid B) = \frac{P(A \cap B)}{P(B)} \quad [\text{Math. 2}]$$

The Bayes theorem (3) is obtained from math (1) and (2).

$$P(A \mid B) = \frac{P(B \mid A)P(A)}{P(B)} \quad [\text{Math. 3}]$$

Here it is supposed that the event A is an event which programs data x to a flash memory cell. The x takes a value of either 0 or 1. It is supposed that the event B is an event in which, when the data is read from the flash memory cell, the data is y. The y takes a value of either 0 or 1. It is supposed here that the bit error probability of the relevant flash memory cell is p. It is supposed that p is ascertained via testing. In so doing, a conditional probability P(y|x) can be computed. For example, maths (4) and (5) below are obtained.

$$P(y=0 \mid x=0)=(1-p)P(x=0) \quad [\text{Math.4}]$$

$$P(y=0 \mid x=1)=pP(x=1) \quad [\text{Math.5}]$$

Normally, since P(x=0) and P(x=1) is ½, the value of P(y|x) can be computed in concrete terms. This P(y|x) is called the prior probability. Meanwhile, P(x|y) signifies the probability that, although the data read from the flash memory cell is y, the data programmed to this memory cell in the past was x. This P(x|y) is called the posterior probability. The posterior probability P(x|y) can be computed in accordance with the Bayes theorem (3). The LDPC codes is the ECC for computing the posterior probability P(x|y) using the Bayes theorem (3), and for estimating that x, which maximizes the posterior probability P(x|y), is the correct data.

However, in actuality, computing the posterior probability is not easy. A log-domain Sum-Product Algorithm, which is a typical LDPC codes decoding method, will be explained here. First, it is supposed that the codeword that was programmed to the flash memory adheres to math (6), $$c=(c_1, \ldots, c_N) \quad [\text{Math.6}]$$

and that the codeword that was read adheres to math (7).

$$r=(r_1, \ldots, r_N) \quad [\text{Math.7}]$$

The log-domain Sum-Product Algorithm does not compute the posterior probability, but rather computes a log likelihood ratio function. When it is supposed that X is a random variable that takes a value of either 0 or 1, the log likelihood ratio function of the random variable X is defined as:

$$\lambda(X) \triangleq \log \frac{P(X=0)}{P(X=1)} \quad [\text{Math. 8}]$$

In so doing, the log likelihood ratio function of a prior probability P(rn|cn) of the $n^{th}$ bit of the codeword can be computed from maths (4) and (5).

$$\lambda_n = \begin{cases} \log \frac{1-p}{p} & (r_n = 0) \\ \log \frac{p}{1-p} & (r_n = 1) \end{cases} \quad [\text{Math. 9}]$$

Next, a check bit $z_{mn}$ for detecting an error is defined.

$$z_{mn} \triangleq \sum_{j \in A(m,n)} c_j \quad \text{[Math. 10]}$$

The sum of math (10) expresses an exclusive OR, and A(m,n) is a set of indices of a parity check matrix H.

$$A(m,n) \triangleq \{j | H_{mj} = 1 \cap j \neq n\} \quad \text{[Math.11]}$$

Furthermore, math (12) defines B(n,m) as a set of indices of a parity check matrix.

$$B(n,m) \triangleq \{i | H_{in} = 1 \cap i \neq m\} \quad \text{[Math.12]}$$

Math (13) and (14) hold when it is supposed that the posterior log likelihood ratio function corresponding to the check bit $z_{mn}$ is alpha$_{mn}$, and the posterior log likelihood ratio function corresponding to the $n^{th}$ bit $c_n$ of the codeword is beta$_{mn}$.

$$\alpha_{mn} = \left( \prod_{j \in A(m,n)} \text{sign}(\lambda_j + \beta_{mj}) \right) f\left( \sum_{j \in A(m,n)} f(|\lambda_j + \beta_{mj}|) \right) \quad \text{[Math. 13]}$$

$$\beta_{mn} = \sum_{i \in B(n,m)} \alpha_{in} \quad \text{[Math. 14]}$$

A function f is called Gallager's f function.

$$f(x) \triangleq \log \frac{e^x + 1}{e^x - 1} \quad (x > 0) \quad \text{[Math. 15]}$$

In a case where beta$_{mn}$ is clear from math (13), alpha$_{mn}$ can be computed. However, as is evident from math (14), beta$_{mn}$ is computed from alpha$_{mn}$. It is not possible to precisely compute the posterior log likelihood ratio function like this. Consequently, an approximate computation is performed. First, math (13) is computed using beta$_{mn}$=0. In so doing, a provisional value of alpha$_{mn}$ is computed. Substituting this provisional value into math (14) makes it possible to compute beta$_{mn}$. Plugging the beta$_{mn}$ obtained here into math (13) makes it possible to compute a new alpha$_{mn}$. By repeating this, alpha$_{mn}$ and beta$_{mn}$ can be expected to converge into a certain value. Then, as is clear from definitional math (8) of the log likelihood ratio function, each bit of the codeword can be estimated using the following math.

$$\hat{c}_n = \begin{cases} 0 & \left( \text{sign}\left(\lambda_n + \sum_{i \in B(n)} \alpha_{in}\right) \right) \\ 1 & \left( \text{sign}\left(\lambda_n + \sum_{i \in B(n)} \alpha_{in}\right) \right) \end{cases} \quad \text{[Math. 16]}$$

Above computation stated as following algorithmic form.

Step 0: Set the maximum value of the number of iterative computations. Set the number of iterative computations 1 to 0. Furthermore, set all beta$_{mn}$ to 0.
Step 1: Compute math (13) for all m.
Step 2: Compute math (14) for all n.
Step 3: Estimate the value of each bit of the codeword in accordance with math (16). This is referred to as the temporary estimated word.
Step 4: Calculate product of the temporary estimated word and the parity check matrix.
Step 5: In a case where the computation result of Step 4 equals to 0, assume that the correction is complete. When this is not the case, proceed to Step 6.
Step 6: Increment the number of repetitions 1 by 1.
Step 7: When the number of iterations 1 exceeds the maximum value, assume that correction is not possible and end the processing. When this is not the case, go to Step 1.

The LDPC codes estimates the correct data by computing a posterior probability (strictly speaking, the log likelihood ratio function of a posterior probability) based on a prior probability (strictly speaking, a log likelihood ratio function of a prior probability) like this. The prior probability can be computed when the bit error probability p of the flash memory cell is measured by experiment. However, as described above, the bit error probability p of the flash memory cell increases as data programming is repeated. When the bit error probability of the flash memory cell remains fixed, a deviation with the actual flash memory cell bit error probability occurs. As is clear from looking at the log-domain Sum-Product Algorithms of maths (13) and (16), the prior probability (log likelihood ratio function of the prior probability) plays an important role in correction. Therefore, when the value of the prior probability (=bit error probability p) deviates from the actual value, the LDPC codes becomes incapable of correcting an error.

The technologies of Patent Literatures 1 and 2 are inventions devised for solving this problem. In Patent Literature 1, an LDPC codes error correcting circuit monitors the analog output voltage of the flash memory and compensates the bit error probability p of the flash memory cell. For example, it is supposed that the design is such that data is 1 in a case where the analog output voltage of the flash memory cell is 1 V. When data is repeatedly programmed into the flash memory cell, the degradation of the flash memory cell advances and the analog output voltage falls below 1 V. When it is supposed that the analog output voltage is z V, the relationship in math (17) exists between the bit error probability p of the flash memory cell and the output voltage z.

$$z = 1 - p \quad \text{[Math.11]}$$

The correction capabilities of the LDPC codes can be maintained by correcting the bit error probability p of the flash memory cell and preventing the above-mentioned deviation based on this relationship.

CITATION LIST

Patent Literature

PTL 1: U.S. Pat. No. 7,656,707
PTL 2: US Patent Application Publication No. 2007/0245214

SUMMARY OF INVENTION

Technical Problem

Two problems exist for a technology that monitors the analog output voltage of a nonvolatile storage medium (for example, a flash memory or a phase-change memory) and compensates the error probability.

One problem is a lack of versatility. The physical characteristics and electrical characteristics of nonvolatile storage media differ for each variety. Therefore, in a system for directly monitoring the analog output voltage of nonvolatile storage systems, the ECC circuit must have circuits tailored to each nonvolatile storage medium. Furthermore, the ECC circuit and nonvolatile storage medium must be equipped on the same chip, something that can only be realized by the nonvolatile storage medium vendor.

One more problem is the increased size of the circuit (resulting in increased costs). When each nonvolatile storage medium chip is equipped with ECC circuit, the size (cost) of the circuit for the nonvolatile storage medium increases. Furthermore, in order to monitor the analog output voltage of the nonvolatile storage medium and use the results of this monitoring to correct errors, the analog output voltage must be quantized. An analog-digital conversion circuit is needed to execute this quantization. In addition, a larger capacity storage area is needed to store the quantized values. For example, data must be stored as any one of five values, i.e., 0, 0.25, 0.5, 0.75, and 1. An ordinary ECC circuit can be one bit since the nonvolatile storage medium sends a value of either 0 or 1. However, in the above-mentioned example, five bits are needed for one piece of data. Thus, an analog-digital conversion circuit and a larger storage area for a single piece of data are needed, increasing the size of the circuit. Furthermore, the LDPC codes correcting circuit is known to require a large-capacity storage area, and the nonvolatile storage medium chip equipped with ECC circuit is not practical.

Therefore, an object of the present invention is achieved an error probability that deviates little from the actual error probability by using a circuit that is shared in common by multiple nonvolatile storage media, and, in addition, without increasing the size of the circuit.

Solution to Problem

A nonvolatile storage system comprises multiple nonvolatile storage media, and a controller, which is coupled to the multiple nonvolatile storage media. The controller comprises a storage area for storing management information, which includes probability management information for expressing error probability information of a unit physical area of a nonvolatile storage medium, and an error correcting circuit for performing encoding and decoding using a LDPC codes. The error probability is a probability that data within the unit physical area is incorrect, and is a prior probability, which is the probability of prior to this data having been read. The controller, in a data read process, identifies from the management information an error probability, which is the error probability of a unit physical area comprising the physical area of the read source and is better suited to the state of the read source in the current read process than the error probability identified for the same unit physical area in a past read process, and uses the identified error probability to correct the read data using the error correcting circuit.

A plural of the nonvolatile storage system may make up an information storage system.

The controller (for example, the error correcting circuit), upon having read data from the nonvolatile storage medium and corrected this data, may divide the number of corrected bits by the size of the data that was read, and may regard the value obtained in accordance with this division (or a representative value based on this value, which will be explained further below) as a new bit error probability of the unit physical area.

Furthermore, the management information may comprise information denoting a degree of degradation of a unit physical area (for example, a number of programmings, a number of erases, and a number of reads) and a corresponding relationship with the bit error probability. The controller may identify from the management inform-ration a bit error probability corresponding to the degree of degradation of the read-source unit physical area.

Advantageous Effects of Invention

The present invention makes it possible to achieve an error probability that deviates little from the actual error probability by using a circuit that is shared in common by multiple nonvolatile storage media, and, in addition, without increasing the size of the circuit.

BRIEF DESCRIPTION OF DRAWINGS

FIG. 2 shows an example of a first configuration of a bit error probability management table related to the first example.

FIG. 5 shows an example of a first configuration of a bit error probability management table related to a second example.

FIG. 9 shows an example of the configuration of a bit error probability management table related to a third example.

FIG. 13 shows an example of a third configuration of a bit error probability management table related to the first example.

DESCRIPTION OF THE EMBODIMENT

The present invention is applicable to all nonvolatile storage systems comprising types of nonvolatile storage media for which the bit error probability increases during use (for example, pursuant to programming, erasing, or degradation over time).

A number of examples will be explained hereinbelow.

Furthermore, in the following explanation, various types of information may be explained using the expression "xxx table", but the various information may also be expressed using a data structure other than a table. To show that the various information is not dependent on the data structure, "xxx table" can be called "xxx information".

Furthermore, in the following explanation, a number is used as information for identifying an element, but another type of reference sign, such as alphabetical characters, may be used either instead of or in addition to a number.

EXAMPLE 1

Figure 1:
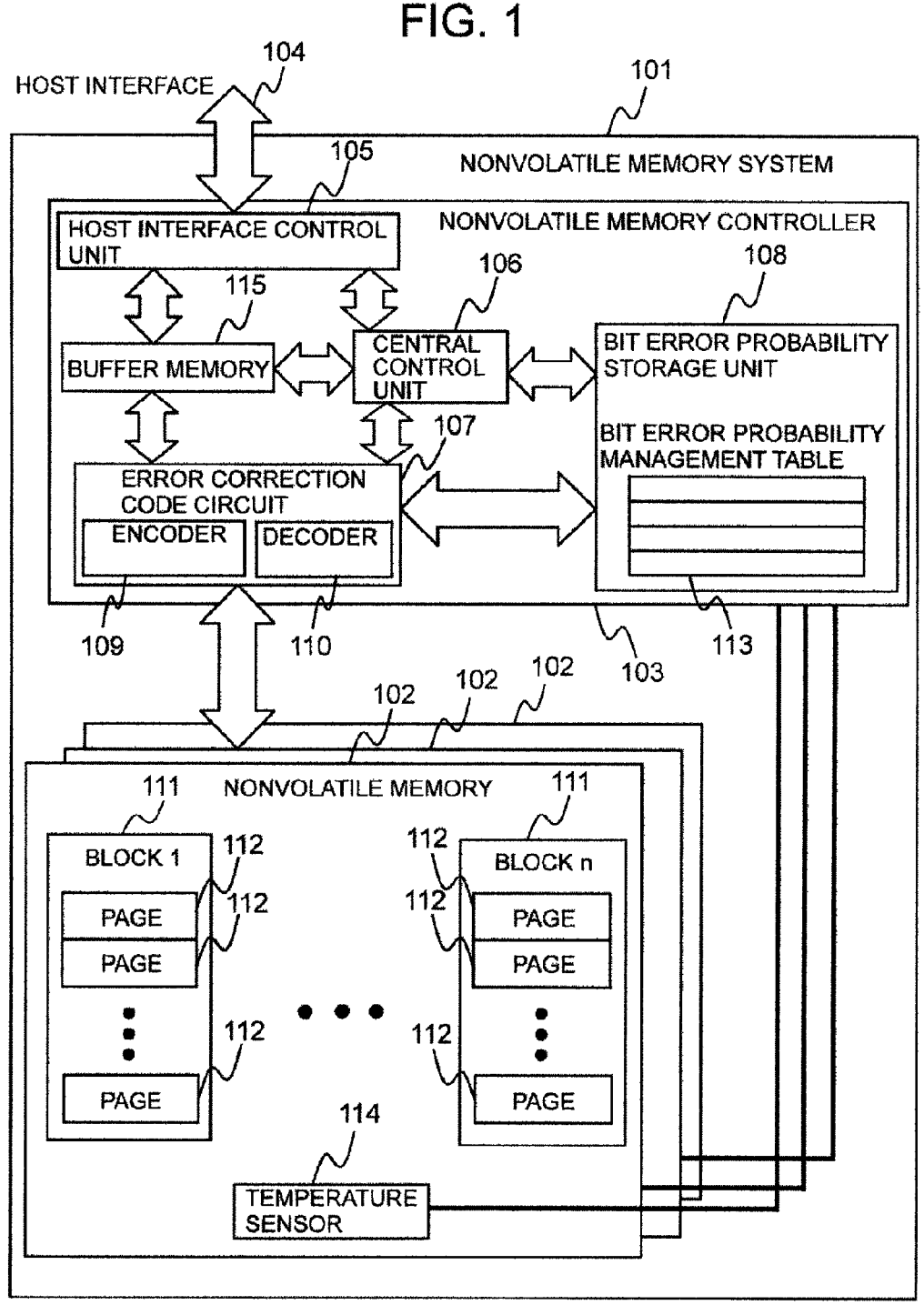
FIG. 1 shows an example of the configuration of a nonvolatile memory system related to a first example.

FIG. 1 shows a nonvolatile memory system related to a first example.

A nonvolatile memory system 101 comprises multiple (or one) nonvolatile memories 102, and a nonvolatile memory controller 103, which is coupled to the multiple non-volatile memories 102 and controls these memories 102. The nonvolatile memory controller 103 is coupled to a host (not shown in the drawing) by way of a host interface 104. The host (not shown in the drawing) sends a data input/output command to the nonvolatile memory controller 103, and the nonvolatile memory controller 103 executes the input/output of the data to/from the nonvolatile memory 102 in accordance with this command.

The nonvolatile memory controller 103 comprises a host interface control unit 105 for controlling the host interface 104, an error correcting code circuit 107 for encoding/decoding data, a bit error probability storage unit 108 for storing a bit error probability, a central control unit 106, and a buffer memory 115 for temporarily storing data. The central control unit 106 controls the nonvolatile memory controller 103 as a whole, such as communications with the host and control of the nonvolatile memory 102. Furthermore, the nonvolatile memory controller 103 has a buffer memory 115, and temporarily stores data sent from the host and temporarily stores data read from the non-volatile memory 102. In addition, the buffer memory 115 may be used as a cache. The host interface control part 105 may comprise a microprocessor for executing a computer program. The error correcting codes circuit 107 comprises an encoder 109 and a decoder 110. The nonvolatile memory controller may have multiple the error correcting codes circuits. The nonvolatile memory 102 is partitioned into multiple blocks 111. A block 111 may be configured from multiple pages 112. The bit error probability storage part 108 stores a bit error probability management table 113 for storing a bit error probability. The bit error probability storage unit 108 may be nonvolatile. The bit error probability storage unit 108 may be inside the nonvolatile memory 102, or may be stored in another nonvolatile storage medium inside this non-volatile memory system 101. Furthermore, a temperature sensor 114 is mounted in each nonvolatile memory 102. Since the bit error probability of the nonvolatile memory is affected by temperature, the nonvolatile memory controller 103 may take into account a temperature detected by the temperature sensor 114 to correct a bit error probability. An example that takes temperature dependency into account is the third example, which will be explained further below.

FIG. 2 shows an example of a first configuration of the bit error probability management table 113.

The bit error probability management table 113 comprises a block number column 201 in which a block number is registered, a bit error probability column 202 in which a value denoting a bit error probability is registered, and a nonvolatile memory number column 203 in which a number uniquely allocated to a nonvolatile memory 102 is registered. It is preferable that a bit error probability of a nonvolatile memory cell be stored for each nonvolatile memory cell of the nonvolatile memory 102. However, doing so would make the size of the bit error probability management table extremely large. Consequently, according to FIG. 2, a bit error probability is stored for each block, which is the unit of management of the nonvolatile memory 102. Therefore, a representative value of a bit error probability for a cell of the nonvolatile memory 102 inside the block 111 may be registered in the column 202 corresponding to the block. A value based on the bit error probabilities of multiple cells configuring the block 111 (for example, a randomly selected value, a minimum value, a maximum value, or an average value) may be used as the representative value. In the first example, a bit error probability of the nonvolatile memory 102 is measured via testing when the non-volatile memory system is designed, and an initial value of the representative value of the block 111 bit error probability is registered in the column 202 corresponding to the block 111.

In a case where the nonvolatile memory 102 is a flash memory, a system for registering the representative value for the bit error probability of the flash memory cell inside the block 111 as shown in FIG. 2 is preferable. This is because the degradation of the flash memory cell progresses in units of blocks. The nonvolatile memory controller 103 erases data inside the flash memory in units of blocks. This erase operation damages the flash memory cell. Therefore, the number of erases becomes an indicator for determining the bit error probability of the flash memory cell. Since the number of erases will differ for each block, the system of FIG. 2 for storing a representative value for each block as the bit error probability is considered preferable.

Figure 3:
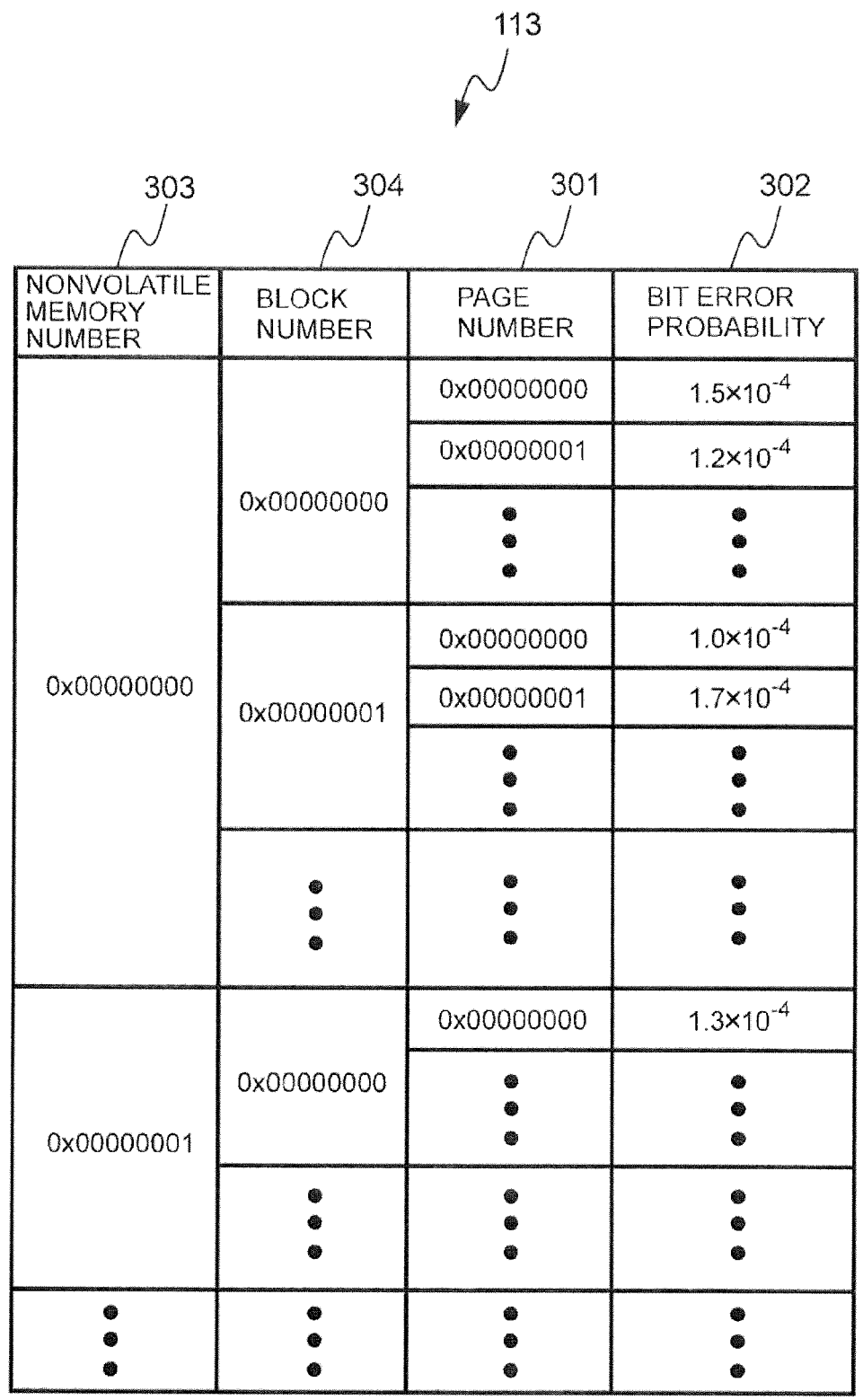
FIG. 3 shows an example of a second configuration of a bit error probability management table related to the first example.

FIG. 3 shows an example of a second configuration of the bit error probability management table 113.

In FIG. 2, since the degradation of the flash memory cell progresses in accordance with the erase operations, and an erase is carried out in units of blocks, a system for storing the representative value of a one bit error probability for one block is employed. However, strictly speaking, the bit error probability of all the pages configuring one block will not be the same. This is attributable to the physical properties of the flash memory. Taking this into account, it is preferable that the bit error probability be managed in units of pages. Whether or not the bit error probability differs for each page will depend on the physical characteristics of each nonvolatile memory. Therefore, it is preferable that the unit of management for the bit error probability be decided based on the characteristics of the installed nonvolatile memory. In the first example, an example in which the bit error probability differs for each page is given.

As shown in FIG. 3, a page number is registered in a page number column 301, and a value denoting the bit error probability of each page 112 is registered in a bit error probability column 302. Furthermore, the number of the block 111 comprising the page 112 is registered in a block number column 304, and the number of the nonvolatile memory 102 comprising the block is registered in a nonvolatile memory number column 303. Then, a test in which data is written/read to/from the nonvolatile memory 102 may be carried out when the nonvolatile memory system is designed, a bit error probability may be computed for each page, and the computed bit error probability may be registered as an initial value in the bit error probability column 302.

Storing a bit error probability for each page makes possible more accurate error correction using the LDPC code.

It is preferable to store the bit error probability in units of pages, but the problem is that this will increase the size the bit error probability management table 113.

Consequently, with regard to a set of pages for which the bit error probabilities may be considered practically uniform, only the representative value of the bit error probabilities may be stored for each set of pages. For example, among m-value MLC (Multi-Level ell) flash memories, there are varieties in which the bit error probabilities are substantially identical for a set of pages for which the remainders obtained by dividing the page numbers by m are identical.

FIG. 13 shows an example of a third configuration of the bit error probability management table 113.

An example in which the bit error probabilities are substantially constant for a set of pages for which the remainders obtained by dividing the page number of each page in the nonvolatile memory 102 by m are identical, will be explained below.

The bit error probability management table 113 comprises a block number column 1301, a page number remainder column 1302, a bit error probability 1303, and a non-volatile memory number column 1304. A block number is registered in the block number column 1301. A value denoting the remainder obtained by dividing the page number by m is registered in the page number remainder column 1302. A representative value of bit error probabilities for a set of pages for which the remainder values obtained by dividing the page numbers by m are identical is registered in the bit error probability column 1303. The number of the nonvolatile memory 102 is registered in the nonvolatile memory number column 1304.

When the nonvolatile memory controller 103 accesses data inside the nonvolatile memory 102, the nonvolatile memory controller 103 specifies the block number and the page number in this nonvolatile memory 102. The nonvolatile memory controller 103 computes a remainder obtained by dividing the page number by m, and identifies the bit error probability corresponding to this remainder from the bit error probability column 1303. The bit error probability of the nonvolatile memory 102 may be measured by experiment when the non-volatile memory system 101 is designed, and the initial value of a representative value of the bit error probability may be registered for a set of pages.

In the above explanation, a set of pages for which the bit error probabilities are substantially identical is a set of pages for which the remainders obtained by dividing the page numbers by m are identical. Whether the bit error probabilities for a set of pages are substantially identical or not is believed to be a function of the structure and physical properties of the nonvolatile memory 102. Therefore, when the structures of the nonvolatile memories 102 differ, the configuration of the bit error probability management table 113 may change. However, a mode in which the nonvolatile memory controller 103 stores a representative value of the bit error probabilities for a set of pages having substantially identical bit error probabilities even when the structures of the nonvolatile memories differ is also included within the scope of the present invention. For example, since m=2 in the case of a two-value MLC flash memory, the size of the bit error probability management table 113 can be kept small due to the fact that only two bit error probabilities are stored per block.

Figure 4:
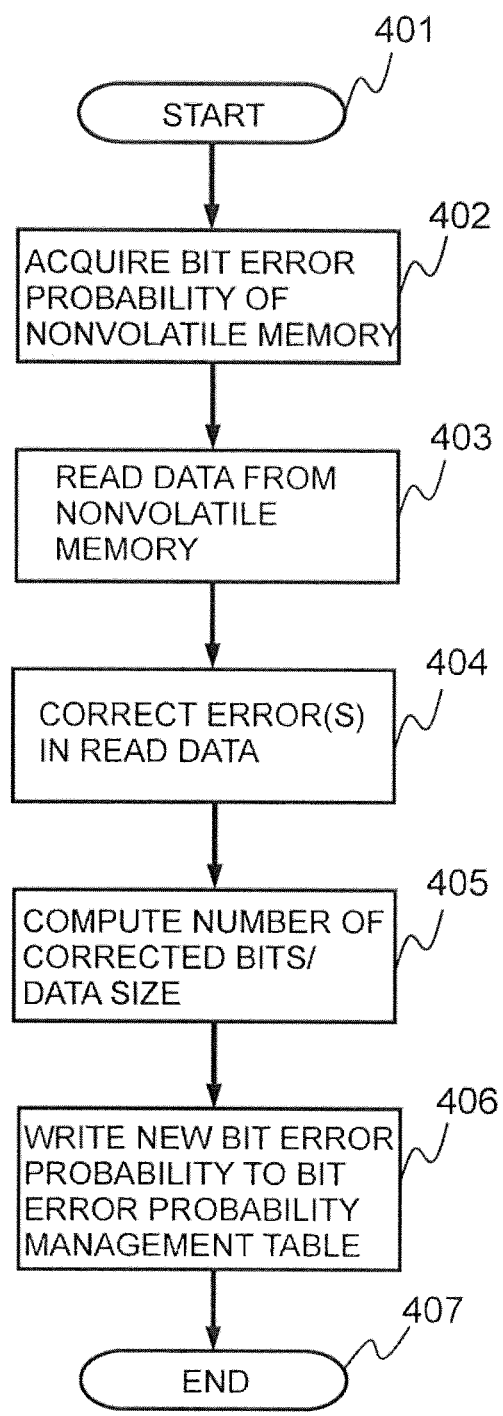
FIG. 4 is a flowchart showing an example of the flow of a data read process related to the first example.

FIG. 4 is a flowchart showing an example of the flow of processing for the nonvolatile memory controller 103 to read data from the nonvolatile memory 102.

(Step 401) Processing starts. Examples of triggers for starting processing are the host sending a read command to the nonvolatile memory controller 103, or the nonvolatile memory controller 103 migrating data from a certain block 111 to a different block 111 (for example, a reclamation).

(Step 402) The nonvolatile memory controller 103 (for example, the central control unit 106) identifies the number of a block 111 and the number of a page 112 in which the read-target data is stored. These numbers may be identified on the basis of a physical address corresponding to a logical address denoted by the command received via a host interface, or may be identified as the migration-source physical address of data at the time of a reclamation. The nonvolatile memory controller 103 (for example, the decoder 110 inside the error correcting codes circuit 107) identifies a bit error probability corresponding to either the identified block 111 or page 112 from the bit error probability management table 113.

(Step 403) The nonvolatile memory controller 103 (for example, the central control unit 106) reads the read-target data from the nonvolatile memory.

(Step 404) The decoding circuit 110 inside the error correcting code circuit 107 uses the bit error probability identified in Step 402 to correct an error in the data read in Step 403. Furthermore, in a case where there are no errors in this data, Step 404 may be skipped.

(Step 405) The decoding circuit 110 divides the number of corrected bits by the size of the read data (codeword length).

(Step 406) The nonvolatile memory controller 103 registers the value computed in Step 405 (the division result) in the relevant location of the bit error probability management table 113 (the column 302 corresponding to the read-source page of the data read in Step 403) as a new bit error probability.

(Step 407) Processing ends.

An example in which it is supposed that the nonvolatile memory 102 is a flash memory, and the nonvolatile memory 102 is partitioned and managed in multiple blocks 111 (an example in which the block 111 is managed by being partitioned into multiple pages 112) has been explained hereinabove. Furthermore, an example in which each block is managed by being partitioned into multiple pages 112 was explained. However, the present invention is not dependent on the method for managing the nonvolatile memory 102. The nonvolatile memory 102 may be managed without being partitioned. In accordance with this, the bit error probability management table 113 may be such that there is one bit error probability column for one nonvolatile memory 102. Furthermore, in a case where the table of FIG. 2 is used, the bit error probability corresponding to a block 111 may be updated no matter which page 112 of this block 111 the data is read from.

In this example, the number of corrected bits (the number of corrected bits among the data that was read) is divided by the data size (the size of the data that was read), and the result is registered in the bit error probability management table 113 as a new bit error probability (a post-update bit error probability). In the first example, a temperature detected by the temperature sensor 114 (the temperature of the nonvolatile memory 102) need not be used when computing the new bit error probability.

According to the first example, the bit error probability is corrected at the time of a data read. For this reason, even when the bit error probability of the physical area (for example, the memory 102 itself, a block 111, or a page 112) rises in accordance with the degradation of the nonvolatile memory 102, a correction using the LDPC codes is possible without the bit error probability, which is the decoding parameter, deviating from the actual bit error probability of this physical area. Furthermore, instead of the bit error probability being corrected for each physical area each time data is read, this correction may be performed each time data is read N time (where N is an integer of equal to or larger than 2).

Furthermore, according to the first example, the nonvolatile memory controller 103, which is outside the multiple nonvolatile memories 102 and is shared in common with the multiple nonvolatile memories 102, corrects the error probability for each physical area. For this reason, an error probability can be corrected using a common circuit for multiple nonvolatile memories 102, and, in addition, error probability correction can be carried out without increasing the circuit size of the nonvolatile memory 102.

Furthermore, according to the first example, the latest bit error probability can be appropriately configured based on the size of the data that was read and the number of corrected bits.

EXAMPLE 2

A second example will be explained below. In so doing, the differences with the first example will mainly be explained, and explanations of the points in common with the first example will either be simplified or omitted.

The bit error probability of the flash memory is affected by the elapsed time from when data is programmed until the data is read (hereinafter, the PR elapsed time), for example, is proportional to the PR elapsed time. That is, when it is supposed that the PR elapsed time is t, the bit error probability is expressed using math (18).

$$p(t) = a_0 t + p_0 \quad \text{[Math.18]}$$

The $a_0$ is a proportionality coefficient, and the $p_0$ is an intercept. In a case where the nonvolatile memory 102 is managed in units of blocks, the bit error probability management table 113 stores the time at which the data was last programmed, the proportionality coefficient, and the intercept for each block. Numerical values obtained by experiment may be used as the initial values of the numerical values registered in these columns. Furthermore, the PR elapsed time, in a case where the data last programmed to the block is data A and the data to be read is also data A, is the time from when data A was programmed until the time this data A was read, and in a case where the data to be read is other data C inside the same block, is the time from when the data A was programmed until when the data C was read.

FIG. 5 shows an example of a first configuration of the bit error probability management table 113 related to the second example.

The bit error probability management table 113 comprises a block number column 501, a time storage column 502 for storing the time at which data was last programmed to the block, a proportionality coefficient column 503, and an intercept column 504. The nonvolatile memory controller 103 can use this information to compute the bit error probability of each block 111 using math (18), and use this computed bit error probability to correct an error in data to be read next time.

As in the first example, it is preferable that the bit error probability be stored for each page.

Figure 6:
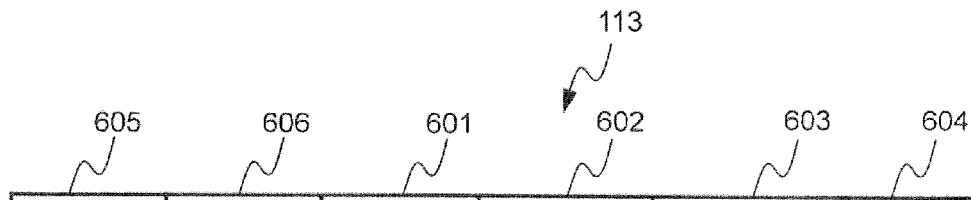
FIG. 6 shows an example of a second configuration of a bit error probability management table related to the second example.

FIG. 6 shows an example of a second configuration of the bit error probability management table 113 related to the second example.

The bit error probability management table 113 comprises a page number column 601, a time storage column 602 for storing the time at which data was last programmed to the page, a proportionality coefficient column 603, and an intercept column 604. Numerical values obtained via testing may be used as the initial values of the numerical values registered in these columns.

Figure 14:
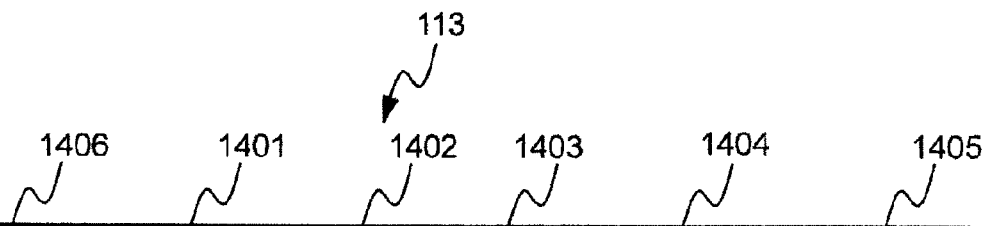
FIG. 14 shows an example of a third configuration of a bit error probability management table related to the second example.

FIG. 14 shows an example of a third configuration of the bit error probability management table 113 related to the second example.

The same as in FIG. 13, in a case where the bit error probabilities are substantially identical for a set of pages for which the remainders obtained by dividing the page numbers by m are identical, the bit error probability is registered in the bit error probability management table.

The bit error probability management table 113 comprises a block number column 1401, a page number remainder column 1402, a column 1403 for the time at which the data was last programmed, a proportionality coefficient column 1404, an intercept column 1405, and a nonvolatile memory 102 number column 1406.

The nonvolatile memory controller 103 computes a page number remainder from the number of the block and the number of the page of the data read source. Then, the nonvolatile memory controller 103 refers to the bit error probability management table 113 and identifies the time at which data was last programmed, the proportionality coefficient, and the intercept. The nonvolatile memory controller 103 can then use math (7) to compute the bit error probability corresponding to the set of pages comprising data read-source page, and can use this bit error probability to correct an error in this read data.

The size of the table 113 of FIG. 14 is smaller than the size of the table 113 shown in FIG. 6. Numerical values obtained via testing may be used as the initial values of the proportionality coefficient column 1404 and the intercept column 1405.

In this example, in a case where a set of pages has substantially identical bit error probabilities, it is supposed that the set of pages have identical remainders obtained by dividing the page numbers by m. This is a function of the structure of the nonvolatile memory 102. Therefore, when the structures of the nonvolatile memories 102 differ, the mode of the bit error probability management table 113 changes. However, a mode in which the nonvolatile memory controller 103 stores a representative value of the bit error probabilities for a set of pages having substantially identical bit error probabilities when the structures of the nonvolatile memories differ is also included within the scope of the present invention.

Figure 7:
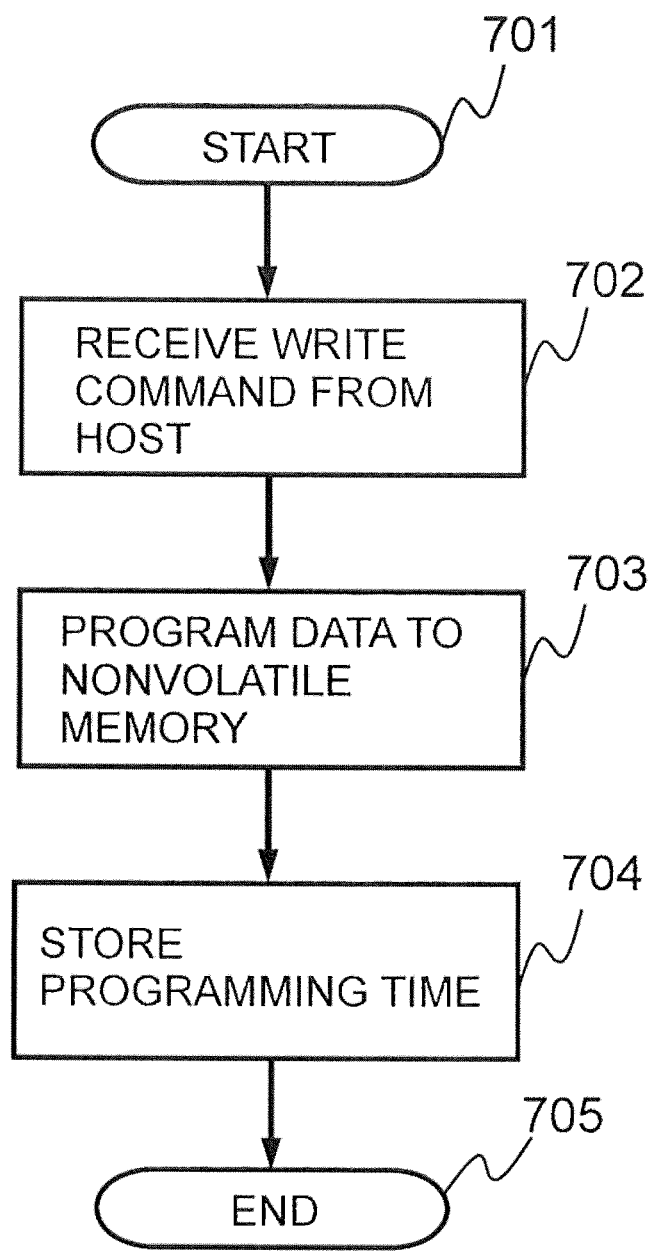
FIG. 7 is a flowchart showing an example of the flow of a data write process related to the second example.

FIG. 7 is a flowchart showing an example of the flow of processing for the non-volatile memory controller 103 to program data to the nonvolatile memory 102.

(Step 701) Processing starts.

(Step 702) The host sends a write command to the nonvolatile memory controller 103, and the nonvolatile memory controller 103 (for example, the central control unit 106) receives this write command.

(Step 703) The nonvolatile memory controller 103 (for example, the central control unit 106) uses the coding circuit 109 to encode the data attached to the command received in Step 702, and programs the encoded data (hereinafter called the codeword) to a host-specified area inside the nonvolatile memory 102 (the page denoted by the physical address corresponding to the logical address shown in the command received in Step 702).

(Step 704) The nonvolatile memory controller 103 (for example, the central control unit 106) registers the data programming time in the time storage column 602 (or 502) corresponding to the page 112 (or block 111) in which the relevant codeword is stored.

(Step 705) Processing ends.

Figure 8:
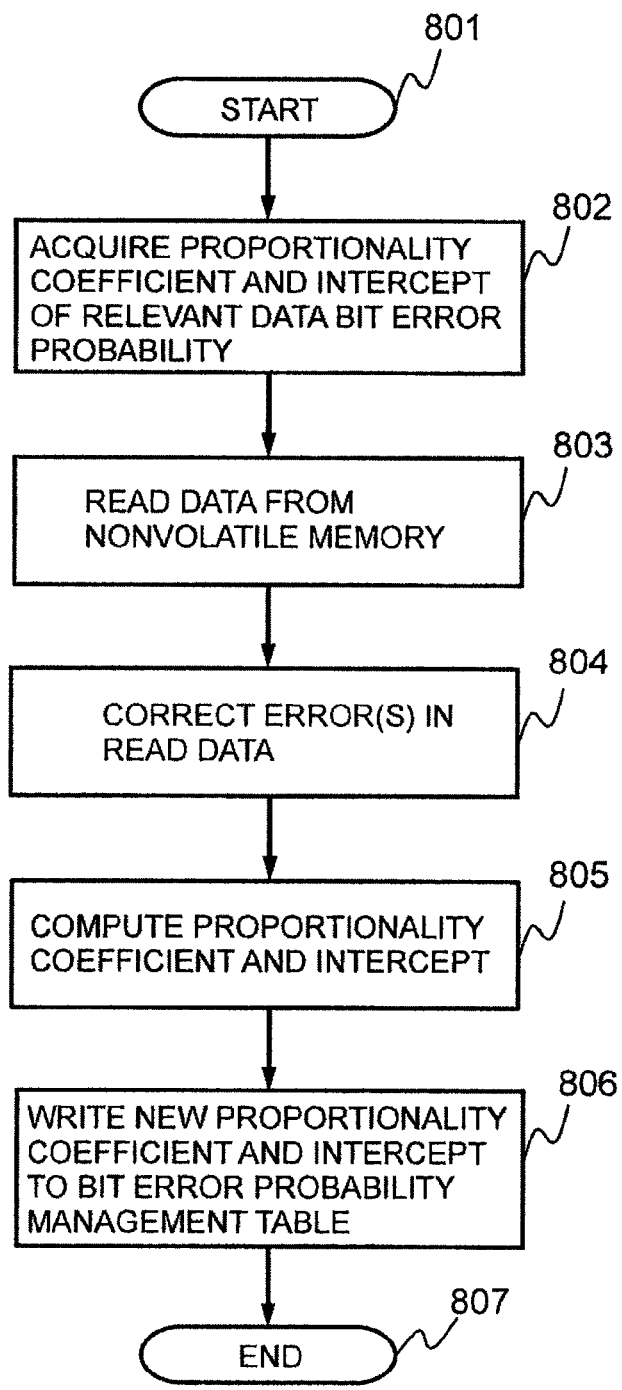
FIG. 8 is a flowchart showing an example of the flow of a data read process related to the second example.

FIG. 8 is a flowchart showing an example of the flow of processing for the non-volatile memory controller 103 to read data from the nonvolatile memory 102.

(Step 801) Processing starts. The triggers for this are the same as in the first example.

(Step 802) The nonvolatile memory controller 103 (for example, the central control part 106), to compute the bit error probability of the page (or block) storing the read-target data, identifies the values registered in the time storage column 602 (or 502) corresponding to the relevant page (or block) in the bit error probability management table 113, the proportionality coefficient column 603 (or 503) and the intercept column 604 (or 504) in the bit error probability management table 113.

(Step 803) The nonvolatile memory controller 103 (for example, the central control part 106) reads the read-target data from the nonvolatile memory 102.

(Step 804) The decoding circuit 110 uses the values identified in Step 802 and the math (18) to compute the bit error probability, and uses this bit error probability to correct an error(s) in the data read in Step 803.

(Step 805) The decoding circuit 110 divides the number of corrected bits by the data size to produce a new bit error probability. When it is supposed here that $t_0$ is the data programming time, $t_1$ is the current time, $p_0$ is the bit error probability computed in Step 804, and $p_1$ is the new bit error probability computed in this Step, a new proportionality coefficient $a_1$ is obtained using math (19).

$$a_1 = \frac{p_1 - p_0}{t_1 - t_0} \quad \text{[Math. 19]}$$

The nonvolatile memory controller 103 (for example, the central control unit 106) computes the new proportionality coefficient $a_1$ using math (19).

(Step 806) The nonvolatile memory controller 103 (for example, the central control part 106) registers the new proportionality coefficient $a_1$ computed in Step 805 and a new intercept $p_1$ in the bit error probability management table 113.

(Step 807) Processing ends.

In this example, an explanation is given premised on the fact that the nonvolatile memory 102 is managed by being partitioned into multiple blocks 111 (a block 111 is managed by being partitioned into multiple pages 112), but management by partitioning is not necessary in a case where the bit error probabilities are uniform across the entire nonvolatile memory 102. In this case, the bit error probability management table 113 may have one bit error probability column for one nonvolatile memory 102.

Furthermore, in this example, a process for updating the bit error probability management table 113 as in Steps 805 and 806 was included, but this process may not be necessary in a case where the fluctuation in the bit error probabilities is small.

In this example, a characteristic by which the bit error probability is proportional to a data PR elapsed time (the time that has elapsed from when the data was programmed until this data was read) is assumed. However, the dependence of the bit error probability on the PR elapsed time is not a direct function like math (7), but rather may be another type of function. Furthermore, in this example, there are two parameters for deciding the bit error probability, but there may be three or more parameters for deciding the bit error probability.

Furthermore, in this example, the values obtained via math (7) are registered in the bit error probability management table 113 as a new slope and intercept. In this example, a temperature detected by the temperature sensor 114 need not be taken into account in the computation of the bit error probability.

According to the second example, it is possible to appropriately configure the latest bit error probability based on the PR elapsed time at data read.

EXAMPLE 3

A third example will be explained below. In so doing, the points of difference with the first example and/or the second example will mainly be explained, and explanations of the points in common with the first example and/or the second example will be simplified or omitted.

In this example, the flash memory bit error probability is decided on the basis of a number of programmings, a number of reads, and a temperature.

Programming data to a page (to include erasing) causes damage to the flash memory cell(s) inside this page and an increase in the bit error probability of this page.

Reading data from a page also causes an increase in the bit error probability of this page. This is referred to as a read disturb. When data is read from a flash memory, electrons are discharged to a small extent from the flash memory cell where the electrons are stored. In a flash memory, the distinction between the information 0 and 1 is made in accordance with states in which electrons are stored and not stored in the flash memory cell. When the electrons stored in the flash memory cell decrease, it becomes difficult to distinguish between a 0 and a 1, and an error occurs in the data. Therefore, the number of times that data is read from a flash memory cell is also a cause of an increase in the bit error probability.

Furthermore, the bit error probability is also a function of temperature. The flash memory cell is surrounded by an insulator. The electrons inside the flash memory cell are trapped due to an insulator energy barrier. However, when the temperature rises, the heat provides energy to the electrons, and a portion of the electrons come to possess energy equal to or greater than the energy barrier of the insulator. These electrons can escape outside the flash memory cell. When the number of electrons stored in the flash memory cell dwindles, it becomes difficult to distinguish between a 0 and a 1, and a data error occurs the same as in the case of a read disturb. Therefore, the bit error probability is a function of temperature.

FIG. 9 shows a bit error probability management table related to the third example.

The bit error probability management table 113 comprises a bit error probability table 901 and a block management table 902.

The bit error probability table 901 comprises a temperature column 903, a number of reads column 904, a number of erases column 905, an elapsed days column 906, and a nonvolatile memory number column 911. In this table 901, each combination of a temperature, number of reads, number of erases, and PR elapsed days (PR elapsed time) denotes a page bit error probability.

For example, it is supposed that a certain block has a temperature of equal to or less than 30 degrees Celsius, a number of reads of $1.0 \times 10^4$, and 200 erases. When the data is read after the lapse of two days since the data was programmed to the block, the bit error probability is $p_{212}$.

The bit error probabilities registered in table 901, for example, may be values computed in accordance with testing. The values registered in the number of erases column 905 may be the number of programmings instead of the number of erases. In accordance with this, the nonvolatile memory controller 103 may update the values of this column 905 at the time of a programming process.

The block management table 902 denotes the status of each block in the nonvolatile memory 102. The block management table 902 comprises a block number column 907, a number of erases column 908, a number of reads column 909, and a time information column 910, which shows the time at which data was last programmed. For example, the block of block number 0×00000000 has been erased 54 times in the past, and has had data read $2.5 \times 10^4$ times in the past. The last time data was programmed to this block was at 1:20:10 on 1 Aug. 2009.

Figure 10:
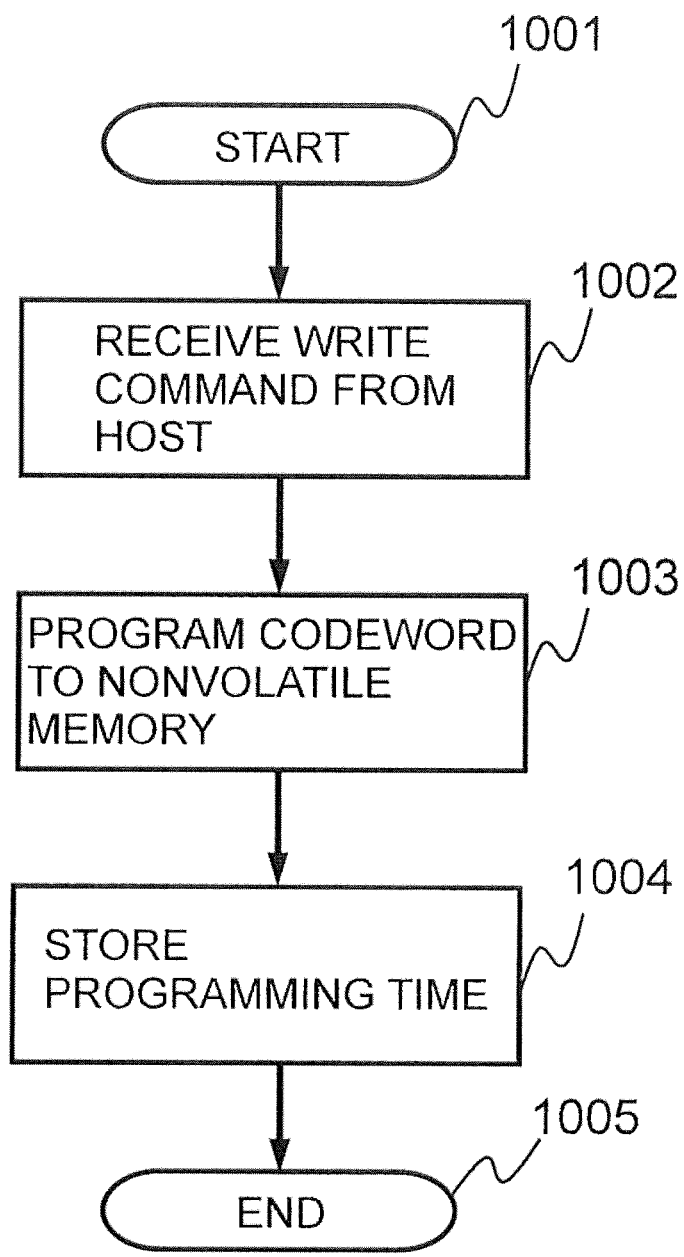
FIG. 10 is a flowchart showing an example of the flow of a data write process related to the third example.

FIG. 10 is a flowchart showing an example of the flow of a data programming process of the nonvolatile memory controller 103 related to the third example.

(Step 1001) Processing starts.

(Step 1002) The host sends a write command to the nonvolatile memory controller 103, and the nonvolatile memory controller 103 receives the relevant write command.

(Step 1003) The nonvolatile memory controller 103 encodes data using the encoder 109, and programs the codeword in host-specified sites (a block and a page) inside the nonvolatile memory 102.

(Step 1004) The nonvolatile memory controller 103 writes the current time in the time information column 909 corresponding to the relevant block (the program-target block in Step 1003) inside the block management table 902.

(Step 1005) Processing ends.

Figure 11:
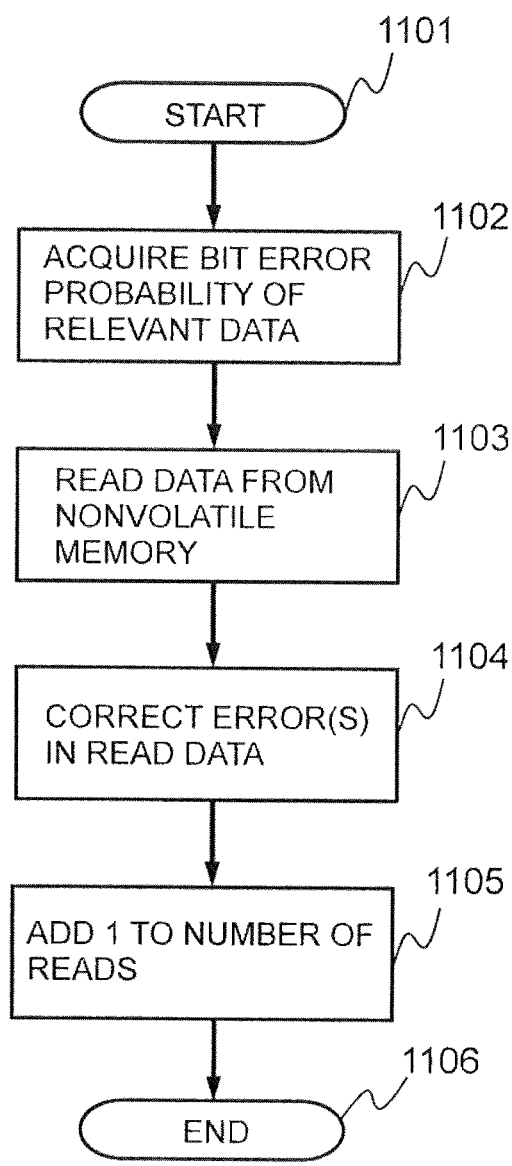
FIG. 11 is a flowchart showing an example of the flow of a data read process related to the third example.

FIG. 11 is a flowchart showing an example of the flow of a data read process of the nonvolatile memory controller 103 related to the third example.

(Step 1101) Processing starts. The triggers for this are the same as in the first example.

(Step 1102) The nonvolatile memory controller 103 identifies the block storing the read-target data. Then, the nonvolatile memory controller 103 (for example, the central control unit 106) identifies the temperature detected by the temperature sensor 114. The nonvolatile memory controller 103 (for example, the central control unit 106) then refers to the block management table 902 and identifies the number of reads 904 and the number of erases 905 under the relevant temperature condition. The nonvolatile memory controller 103 (for example, the central control unit 106) then refers to the block management table 902, identifies the time at which data was last programmed to the read-source block (the block identified in Step 1102), and computes the PR elapsed days, which is the difference between this time and the current time. The nonvolatile memory controller 103 (for example, the central control unit 106), based on these parameters, refers to the bit error probability table 901 and identifies the corresponding bit error probability.

(Step 1103) The nonvolatile memory controller 103 reads the read-target data from the read-source block inside the nonvolatile memory 102.

(Step 1104) The decoding circuit 110 uses the bit error probability identified in Step 1102 to correct an error(s) in the data read in Step 1103.

(Step 1105) The nonvolatile memory controller 103 (for example, the central control part 106) adds 1 to the number of reads denoted by the number of reads column 909 in the block management table 902 corresponding to the read-source block.

(Step 1106) Processing ends.

A process in this example for erasing data inside a block will be explained next. The erase process is executed by the nonvolatile memory controller 103 in accordance with a trigger, such as the unused blocks inside the nonvolatile memory 102 becoming less than a prescribed number.

Figure 15:
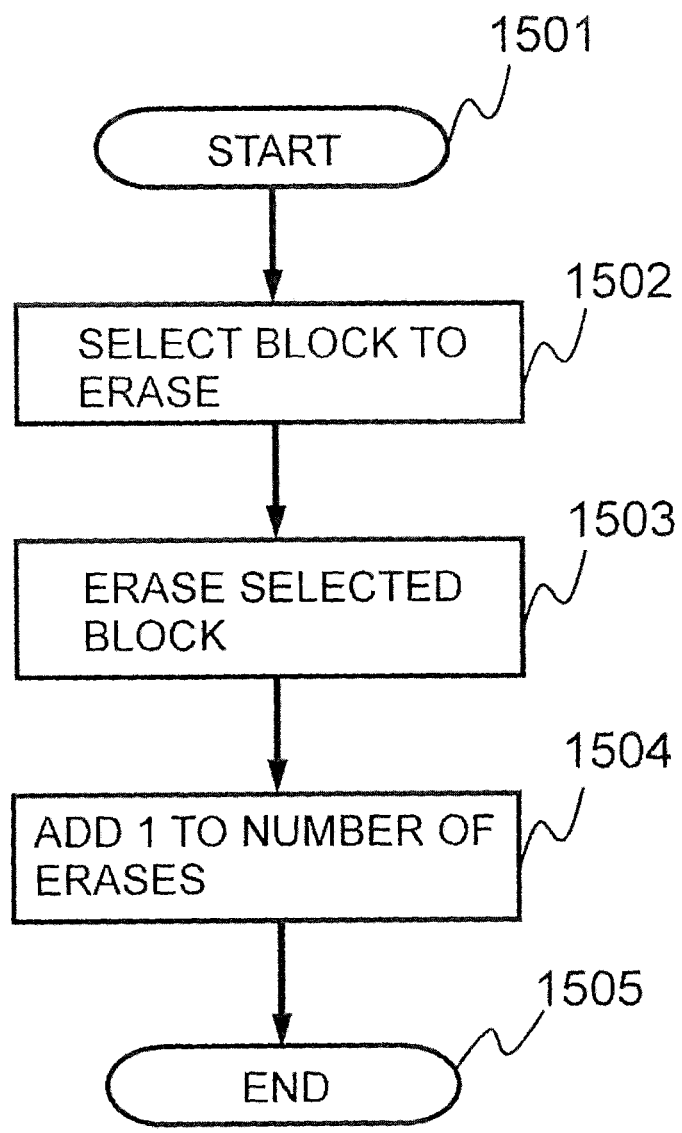
FIG. 15 is a flowchart of an erase process related to the third example.

FIG. 15 shows an example of the flow of an erase process related to the third example.

(Step 1501) Processing starts.

(Step 1502) The nonvolatile memory controller 103 (for example, the central control part 106) selects a block from which to erase data. Data cannot be overwritten in a page of a flash memory. In a case where a page corresponding to a certain range of logical addresses is the end page of a certain block and data is once again programmed to this logical address range, the nonvolatile memory controller 103 programs the new data to an unused block (an erased block in which data is not programmed to any of the pages). Repeating this process creates a block 111 in which only data that has not been referenced for a long time is programmed. Or, the nonvolatile memory controller 103, by carrying out a so-called reclamation process, changes certain blocks 111 into blocks 111 in which only invalid data has been programmed. The nonvolatile memory controller 103 selects an erase-target block from among blocks like these. Various algorithms exist, such as selecting the block with the smallest number of erases.

(Step 1503) The nonvolatile memory controller 103 (for example, the central control unit 106) erases data from inside the block selected in Step 1502.

(Step 1504) The nonvolatile memory controller 103 (for example, the central control unit 106) adds 1 to the number of erases denoted by the number of erases column 908 in the block management table 902 corresponding to the block selected in Step 1502.

(Step 1505) Processing ends.

As has been explained thus far, the present invention is not dependent on the type of nonvolatile memory. The present invention is applicable to any nonvolatile storage medium in which the bit error probability fluctuates while being used. Furthermore, the present invention is not dependent on the unit of management of the nonvolatile memory 102. In the first through the third examples, the explanation assumed that the present invention was applied to a flash memory, and that the unit was the block and the page, but management may be carried out using a different unit. In a case where the bit error probabilities of the nonvolatile memory 102 are uniform for the entire non-volatile memory, the memory 102 need not be managed by being partitioned. Furthermore, in a case where the affects of a read disturb are small, the number of reads column 1904 of the bit error probability table may be omitted. Also, the bit error probability is a probability for each block or page, but is not limited to each block or page. Furthermore, a combination corresponding to the bit error probability need not be configured using all of the temperature, the number of reads, the number of erases (or the number of programmings), and the PR elapsed days (PR elapsed time), but rather may be configured using three or less of these parameters.

According to the third example, bit error probability compensation need not be carried out as in the first and second examples since the characteristic by which the bit error probability increases in accordance with the number of programmings is stored in the bit error probability table 901.

EXAMPLE 4

A fourth example will be explained below. In so doing, the points of difference with the first through the third examples will mainly be explained, and explanations of the points in common with the first through the third examples will be simplified or omitted.

Generally speaking, an information storage system (for example, a nonvolatile memory system) stores information related to failures and performance. There are two kinds of failures, for example, a fatal failure, which, upon occurring one time, renders the storage system unusable, and a failure that does not obstruct operation. Even failures that do not obstruct operation are likely to cause a failure at a site in the storage system when they occur often. If nothing is done about these failures, a fatal failure will occur before too long. Consequently, in a case where a large number of failures that do not obstruct operation occur, the storage system notifies a computer (for example, a management computer or a host computer, referred to hereinafter as the notification-destination computer), which is coupled to the storage system, of information denoting the fact that a large number of such failures have occurred (and the sites in which such large numbers of failures occurred). This computer displays this information. This enables the user of the computer to take preventive maintenance. This kind of function has been standardized as Self-Monitoring Analysis and Reporting Technology (hereinafter called S.M.A.R.T.) under the SCSI (Small Computer System Interface) standard.

Figure 16:
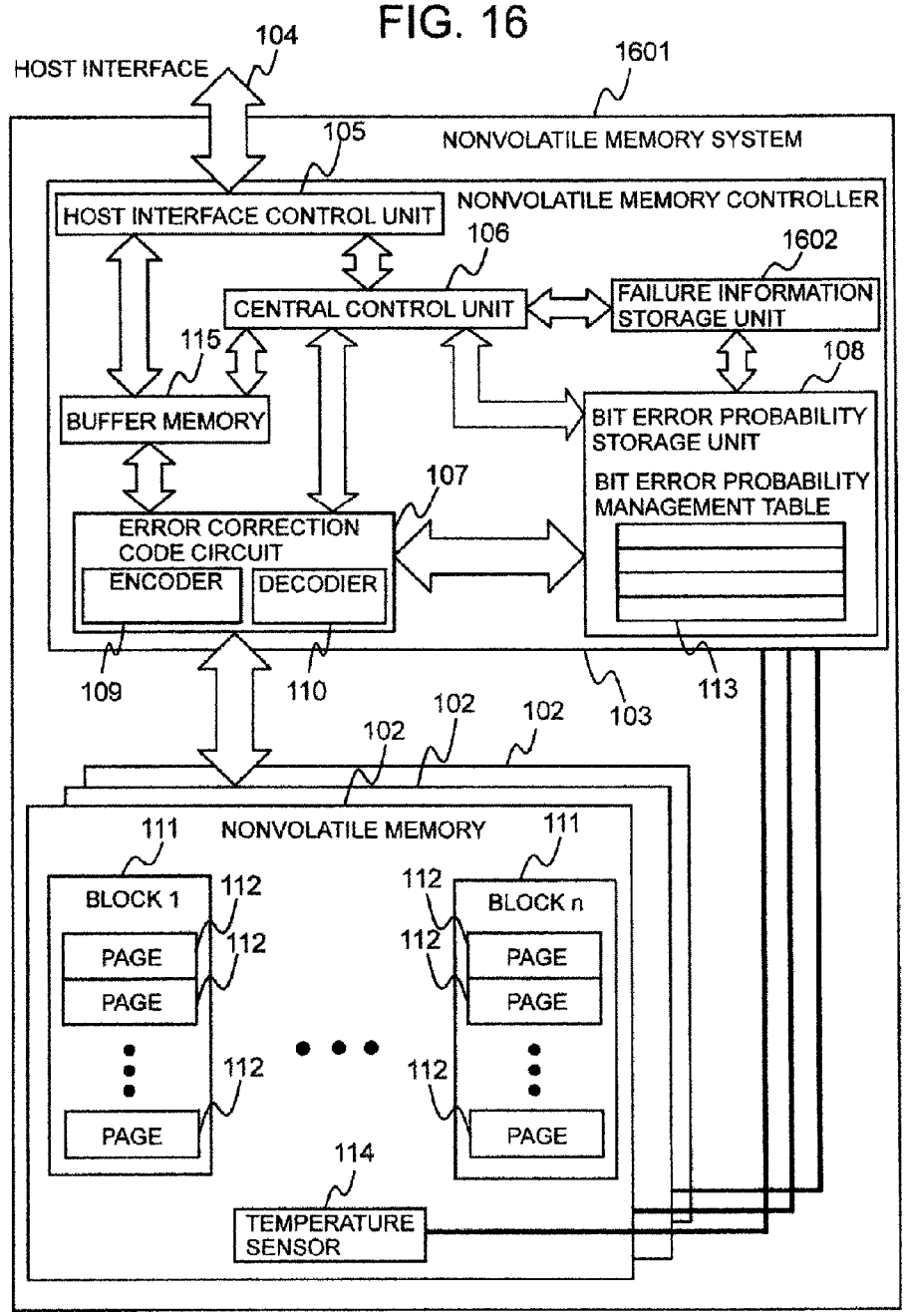
FIG. 16 shows examples of the configuration of a nonvolatile memory system related to the fourth example.

FIG. 16 shows a nonvolatile memory system 1601 related to a fourth example.

According to the nonvolatile memory system 1601 related to this example, a failure information storage part 1602 is added to the nonvolatile memory system 101 of FIG. 1.

Figure 17:
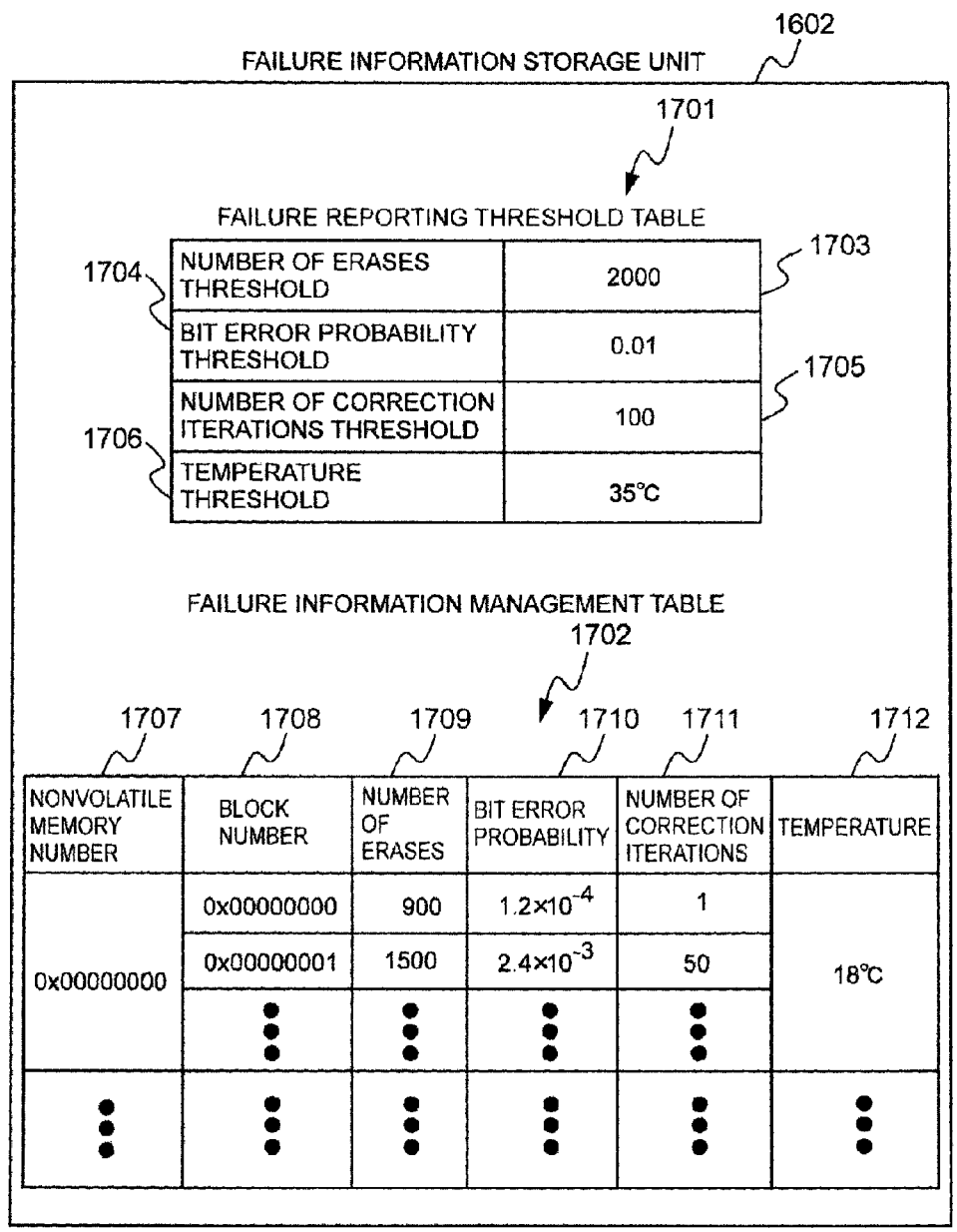
FIG. 17 shows an example of a failure information storage part related to the fourth example.

FIG. 17 shows the failure information storage part 1602.

The failure information storage part 1602 stores a failure reporting threshold table 1701, and a failure information management table 1702.

The failure reporting threshold table 1701 stores a threshold for the number of times a failure can occur without obstructing operation. The table 1701 comprises a number of erases threshold column 1703, a bit error threshold column 1704, a number of correction iterations threshold column 1705, and a temperature threshold column 1706.

The number of erases threshold column 1703 stores a threshold for the number of times a block 111 is erased (erase threshold hereinafter). For the purpose of preventive maintenance, the erase threshold may be configured as a value that is smaller than the maximum number of erases of the nonvolatile memory 102. The erase threshold may be decided by identifying the characteristics of the nonvolatile memory 102 by experiment.

The bit error threshold column 1704 stored a threshold for the bit error probability (error threshold hereinafter). The fact that the bit error probability may be a different value for each block 111 or each page 112 was described using the first example and so forth. In this example, a system, which has one bit error probability for one block 111, is used. Of course, a system, which has a different bit error probability for each page 112, can also be realized in this example. When the bit error probability of any block 111 in the nonvolatile memory 102 exceeds the error threshold, the nonvolatile memory controller 103 reports the need for preventive-maintenance to the notification-destination computer.

The number of correction iterations threshold column 1705 stores a threshold for the number of iterations required for the decoding circuit 110 to decode the data inside the nonvolatile memory 102 (iteration threshold hereinafter). The decode algorithm of the LDPC codes searches for the largest bit string in the posterior probability. An iteration method is one method for searching for the maximum value of the posterior probability. When the degradation of the nonvolatile memory 102 progresses, the number of iterations increases even when errors are able to be corrected. In LDPC code decoding, for example, the designer determines the limit value of the number of iterations based on the limit value of the response time of the nonvolatile memory system 1601. When the number of iterations exceeds this limit value, the nonvolatile memory controller 103 (for example, the decoder 110) reports to the notification-destination computer that error correction is not possible. However, a determination by the decoding circuit 110 that correction is not possible signifies that the data inside the nonvolatile memory 102 has been lost. The loss of data can be avoided when the non-volatile controller 103 reports the need for preventive maintenance to the notification-destination computer before the situation reaches this state. Consequently, it is preferable that the iteration threshold be a value that is smaller than the limit value of the number of iterations. Furthermore, the nonvolatile memory 102 unit of access is the page 112. The number of correction iterations may differ for each page 112, but in this example, a reference value is used inside a single block 111. For example, the average value of the number of correction iterations for multiple pages 112 may be used as the representative value, or the maximum value of the number of correction iterations for multiple pages 112 inside a certain block may be used as the representative value. A representative value may also be determined using another method.

The temperature threshold column 1706 stores a temperature threshold for notifying the notification-destination computer of an abnormal rise in temperature inside the nonvolatile memory system 1601. It is preferable that the temperature threshold be the value of a lower temperature than the maximum temperature at which the operation of the nonvolatile memory system 1601 is guaranteed. This is because the nonvolatile memory system 1601 must operate normally during the time it takes for the user to devise a countermeasure after learning of an abnormal rise in temperature via the notification-destination computer.

Next, the failure information management table 1702 will be explained.

The failure information management table 1702 comprises a nonvolatile memory number column 1707, a block number column 1708, a number of erases column 1709, a bit error probability column 1710, a number of correction iterations column 1711, and a temperature column 1712.

The nonvolatile memory number column 1707 stores the number of a nonvolatile memory 102.

The block number column 1708 stores the number of a block 111.

The number of erases column 1709 stored the number of times that the block 111 has been erased. The number of erases of an erased block 111 is incremented following an erase process.

The bit error probability column 1710 stores the bit error probability of the block 111.

The number of correction iterations column 1711 stores the number of iterations required to decode data inside the block 111. Since the read unit of nonvolatile memory 102 is the page, an in-block 111 representative value must be registered as the numerical value registered in this column. A representative value of the number of iterations, for example, may be the maximum value, the minimum value, or an average value of the number of iterations. Since a data decoding processes is executed when the nonvolatile memory controller 103 reads data from the nonvolatile memory 102, the number of correction iterations may be updated every time there is a decoding process.

The temperature column 1712 stores the temperature of the nonvolatile memory 102. The nonvolatile memory controller 103 stores temperatures regularly (or irregularly) detected by the temperature sensor 114 in the temperature column 1702.

Figure 12:
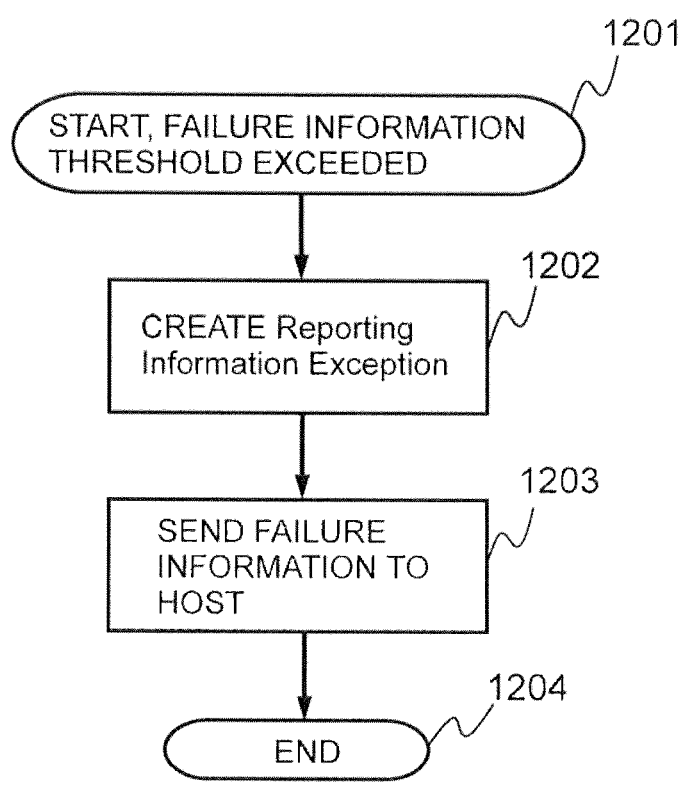
FIG. 12 is a flowchart showing an example of the flow of a first failure information notification process related to a fourth example.

FIG. 12 is a flowchart showing an example of the flow of a first failure information notification process.

(Step 1201) Processing starts. For example, the nonvolatile memory controller 103 (for example, the central control unit 106) starts the processing after the execution of an erase process or as a result of polling from the place where the failure information of any of the nonvolatile memories 102 exceeded the threshold. Specifically, for example, processing starts in a case where at least one of the following has been detected: the number of erases of a certain block has exceeded the erase threshold for this block; the bit error probability of a certain block has exceeded the error threshold for this block; the number of LDPC code correction iterations with respect to a certain block has exceeded the correction iterations threshold of this block; or the temperature of a certain nonvolatile memory 102 has exceeded the temperature threshold for this nonvolatile memory 102.

(Step 1202) In the S.M.A.R.T. standard, means by which the storage system notifies the notification-destination computer (for example, the host) of the need for preventive maintenance is called the Reporting Information Exception. The nonvolatile memory controller 103 creates a Reporting Information Exception, and notifies the notification-destination computer of the occurrence of a preventive maintenance event. Furthermore, the method by which the nonvolatile memory system 1601 notifies the notification-destination computer of a preventive maintenance event is not limited to this method.

(Step 1203) The nonvolatile memory controller 103 sends failure information to the notification-destination computer. As used here, failure information may include the following information:

(1) The number of the site (the nonvolatile memory 102 and/or the block 111) where the failure occurred (a certain type value exceeded the threshold for this type value); and (2) information related to the failure that occurred (for example, information comprising at least one of the number of erases, the bit error probability, the number of correction iterations, and the temperature, and at least one of the thresholds thereof). Or the failure information may include all the information of the failure information management table 1702 (also all the information of the failure reporting threshold table 1701). Furthermore, the nonvolatile memory controller 103 may also include a message recommending that the nonvolatile memory 102 in which the failure occurred be replaced.

(Step 1204) Processing ends.

In addition to the Reporting Information Exception, via which the storage system notifies the host of a preventive maintenance event, the S.M.A.R.T. standard also has a Return S.M.A.R.T. Status command by which the notification-destination computer (for example, the host) orders the storage system to transmit failure information.

Figure 18:
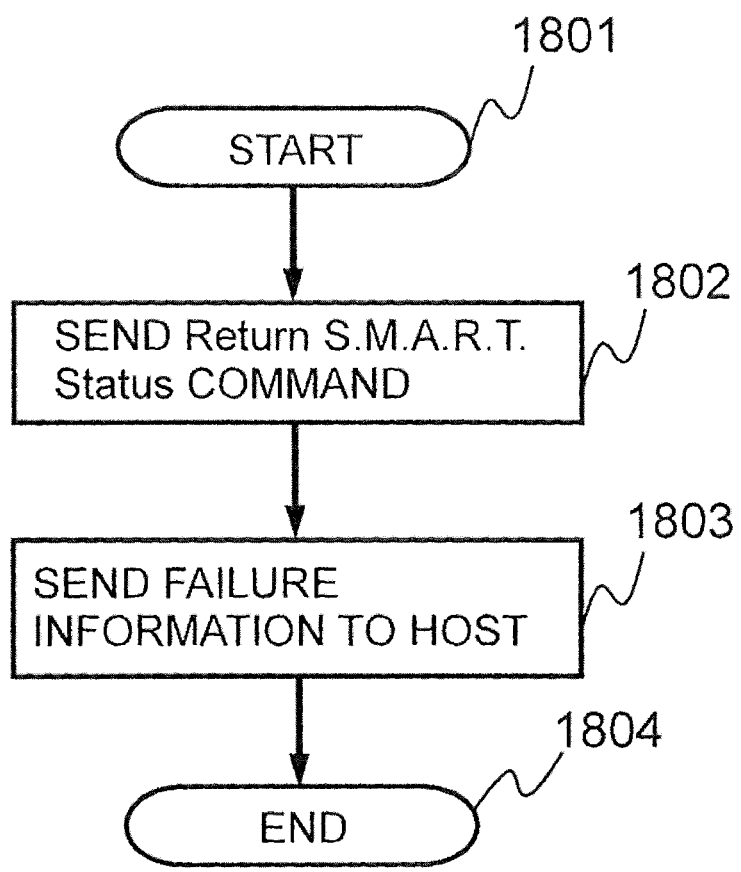
FIG. 18 is a flowchart showing an example of the flow of a second failure information notification process related to the fourth example.

FIG. 18 is a flowchart showing an example of the flow of a second failure information notification process.

(Step 1801) Processing starts. The trigger here may be either an instruction from the user of the notification-destination computer, or regular monitoring by the notification-destination computer.

(Step 1802) The notification-destination computer sends the nonvolatile memory system 1601 a Return S.M.A.R.T. Status command.

(Step 1803) The nonvolatile memory controller 103 receives the Return S.M.A.R.T. Status command, and, in response to this command, sends failure information to the notification-destination computer. The failure information sent at this time may be the same as the failure information sent in Step 1203 of FIG. 12.

(Step 1804) Processing ends.

According to the fourth example, in a case where any of the multiple types of values comprising the number of erases, the bit error probability, the number of correction iterations, and the temperature has exceeded the threshold for this value, this fact can be notified to the notification-destination computer.

EXAMPLE 5

A fifth example will be explained below. In so doing, the points of difference with the first through the fourth examples will mainly be explained, and explanations of the points shared in common with the first through the fourth examples will be either simplified or omitted.

Figure 19:
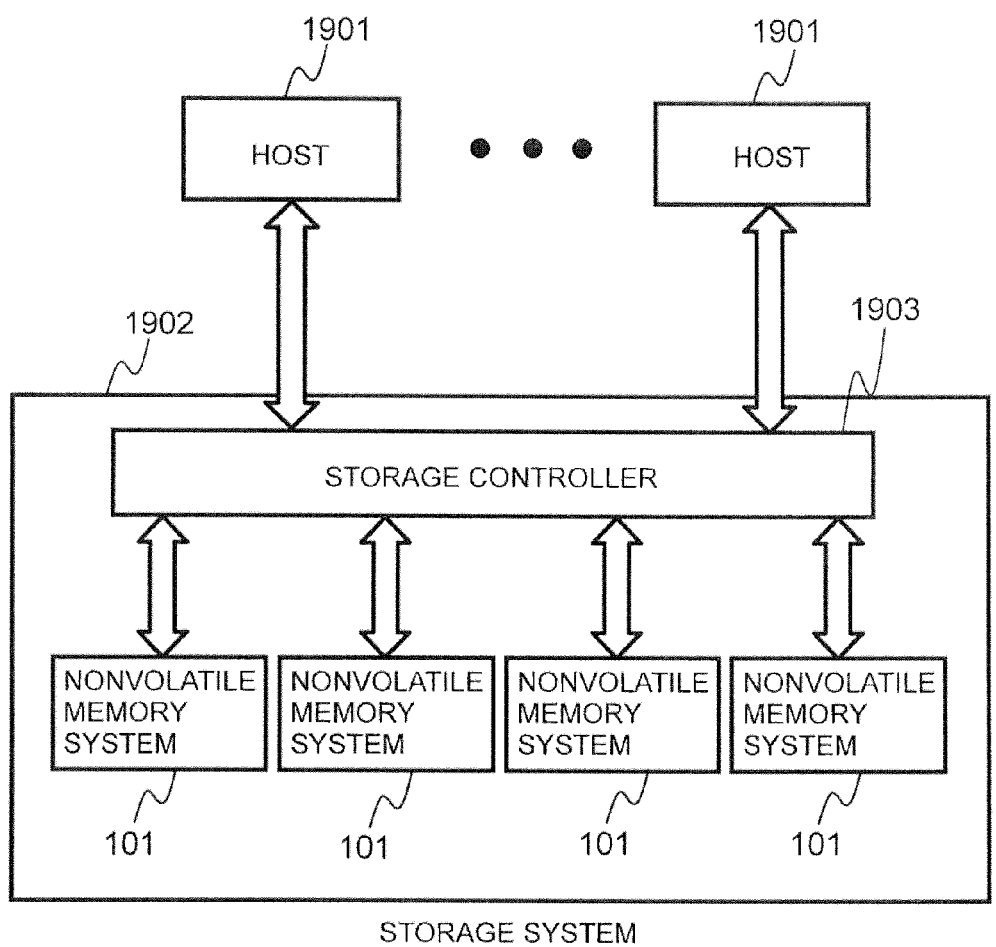
FIG. 19 shows an example of the configuration of a computer system related to a fifth example.

FIG. 19 shows an example of the configuration of a computer system related to the fifth example.

A computer system comprises either one or multiple hosts 1901 and a storage subsystem 1902. The storage subsystem 1902 comprises multiple (for example, four) nonvolatile memory systems 101, and a storage controller 1903 for controlling these systems 101. The storage controller 1903, for example, comprises a front-end interface (FE-IF), which is an interface device that is coupled to the host 1901, a backend interface (BE-IF), which is an interface device that is coupled to the nonvolatile memory systems 101, a memory, and a processor coupled to these components. The storage controller 1903 receives either a first read command or a first write command from the host (the host computer), and identifies the physical address corresponding to the logical address specified in this command. The storage controller 1903 sends either a second read command or a second write command specifying a physical address to the respective nonvolatile memory systems 101 comprising a RAID group.

The storage controller 1903 possesses a RAID (Redundant Array of Inexpensive Disks) function. In this example, for example, a RAID group comprising four non-volatile memory systems 101 takes a RAID5 configuration. In this RAID group, three pieces of data are respectively stored in three nonvolatile memory systems 101, and one parity is stored in one nonvolatile memory system 101.

The storage controller 1903, in a case where any one nonvolatile memory system 101 has failed, notifies the user (for example, the notification-destination computer) to replace this failed nonvolatile memory system 101. When the user replaces the failed nonvolatile memory system 101 in the RAID group with a new nonvolatile memory system 101, the storage controller 1903 uses the data in the remaining nonvolatile memory systems 101 in the RAID group to reconstruct the data in the failed non-volatile memory system 101 and stores this data in the new nonvolatile memory system 101.

In this example, the nonvolatile memory system 101 detects a failure that makes data correction impossible via a processes carried out in response to a command from the storage controller 1903. When the nonvolatile memory system 101 detects a failure that makes correction impossible, the user does not replace the relevant nonvolatile memory system (defective memory system hereinafter) 101, but rather, the storage controller 1903 reconstructs the uncorrectable data inside the defective memory system based on the remaining nonvolatile memory systems 101 in the RAID group, and programs this data to the defective memory system.

Figure 20:
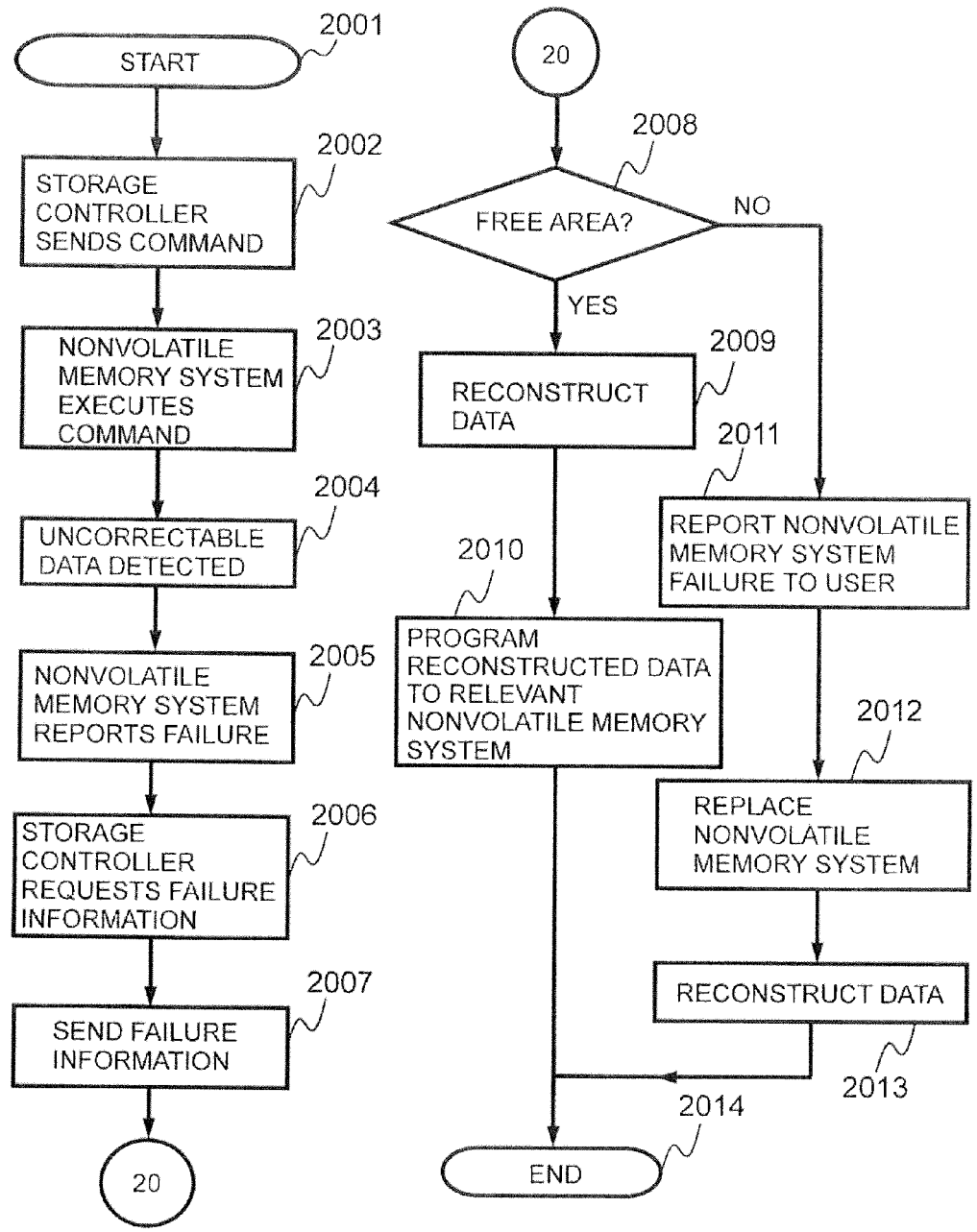
FIG. 20 is a flowchart showing an example of the flow of processing comprising a first failure process related to the fifth example.

FIG. 20 is a flowchart showing an example of the flow of processing comprising a first failure process. The first failure process is carried out in a case where the nonvolatile memory system 101 has detected the fact that a data error cannot be corrected. Furthermore, in this example, "valid data" as used with respect to a logical range to which a logical address belongs typically signifies the data that was last programmed to this logical range (that is, recent data). In a case where there are two or more pieces of data for the same logical range, one of those pieces of data is valid data, and the rest is invalid data. In a reclamation process, the valid data of a certain block is migrated to a different block, leaving only invalid data stored in this certain block, thereby making it possible to erase the data in this certain block.

(Step 2001) Processing starts.

(Step 2002) The storage controller 1903 sends a command to the nonvolatile memory system 101, and this system 101 receives this command. Since the nonvolatile memory system 101 detects a failure that makes correction impossible only in a case where this device 101 reads data (typically valid data) from the nonvolatile memory 102, the command sent by the storage controller 1903 is considered to be limited to a read command. However, the command sent in Step 2002 does not have to be limited to a read command. This is because, when the storage controller 1903 programs data to the nonvolatile memory system 101, the nonvolatile memory controller inside this device 101 reads valid data from the page 112 corresponding to the programming target to the buffer 106, includes the programming-target data in this valid data, and programs data comprising the programming-target data (post-update valid data) to an unused page. That is, a data read from a page occurs in the nonvolatile memory system 101 even in the case of a write command process. For this reason, it is possible for a failure that makes error correction impossible to occur even in a write command process. Therefore, in this step, the command does not have to be a read command.

(Step 2003) The nonvolatile memory system 101 executes the command that was received from the storage controller 1903.

(Step 2004) The nonvolatile memory controller 103 reads data from the nonvolatile memory 102 during the execution of this command, and decodes this data using the decoder 110. In so doing, the nonvolatile memory controller 103 detects the fact that this data cannot be corrected.

(Step 2005) The nonvolatile memory system 101 reports the occurrence of a failure to the storage controller 1903. In the SCSI standard, the nonvolatile memory system 101 reports the occurrence of the failure to the storage controller 1903 by sending a "check condition" status. This is one example in accordance with the SCSI standard, but the same report is also possible in another standard.

(Step 2006) The storage controller 1903 requests failure information from the non-volatile memory system (the defective memory system) 101 that is the source of the failure report. In the SCSI standard, there is a "request sense" command for requesting failure information from the storage system.

(Step 2007) The defective memory system 101 that received the "request sense" command sends the failure information to the storage controller 1903. In the SCSI standard, the nonvolatile memory system that receives the "request sense" command sends the failure information stipulated in the SCSI standard. Furthermore, the SCSI standard leaves room for vendor-specific information to be reported to the storage controller 1903 regarding the failure information, and the defective memory system 101 can also send the failure information explained using the fourth example to the storage controller 1903. In addition, in this example, the storage controller 1903 has the defective memory system 101 report the presence or absence of a free physical area (for example, a block 111).

(Step 2008) The storage controller 1903 determines whether or not a free physical area exists in the defective memory system 101 based on the report from the defective memory system 101.

(Step 2009) In a case where a free physical area exists in the defective memory system 101, the storage controller 1903 uses the data (typically valid data) in the nonvolatile memory systems 101 other than the defective memory system 101 in the RAID group to reconstruct the uncorrectable data (typically valid data) in the memory of this controller 1903. The reconstructed data may be all the valid data in the defective memory system 101, or may be only the uncorrectable valid data.

(Step 2010) The storage controller 1903 programs the reconstructed data to the defective memory system 101. This data is stored in the free physical area (either a block 111 or a page 112) of the defective memory system 101 in accordance with flash memory characteristics.

(Step 2011) in a case where a free physical area does not exist in the defective memory system 101, the storage controller 1903 reports the failure of the nonvolatile memory system 101 to the notification-destination computer (for example, reports the fact that the defective memory system 101 has failed, and the number of this device 101). As a result, the user is urged to replace the defective memory system 101.

(Step 2012) The user replaces the defective memory system 101 with a new non-volatile memory system 101.

(Step 2013) The storage controller 1903 uses the data (typically valid data) in the RAID group nonvolatile memory systems 101 other than the new nonvolatile memory system 101 to reconstruct all the data (typically valid data) stored in the defective memory system 101, and programs this data to the new nonvolatile memory system 101 in this RAID group.

(Step 2014) Processing ends.

FIG. 20 shows the processing in a case where the nonvolatile memory controller 103 of the nonvolatile memory system 101 is normal, and an uncorrectable error has occurred in the nonvolatile memory 102. In this case, the nonvolatile memory controller 103 is normal, and therefore, the occurrence of a failure is reported to the storage controller 1903.

However, in a case where the nonvolatile memory controller 103 is malfunctioning, or there is an extremely large number of iterations for error correction and the correction takes a long time, it appears to the storage controller 1903 that the non-volatile memory system 101 is not responding. Then, when the no-response time has exceeded a preset response time threshold (for example, a threshold decided on the basis of the host 1901 specifications), the storage controller 1903 determines that the relevant nonvolatile memory system 101 has failed. A second failure process is carried out in accordance with this.

Figure 21:
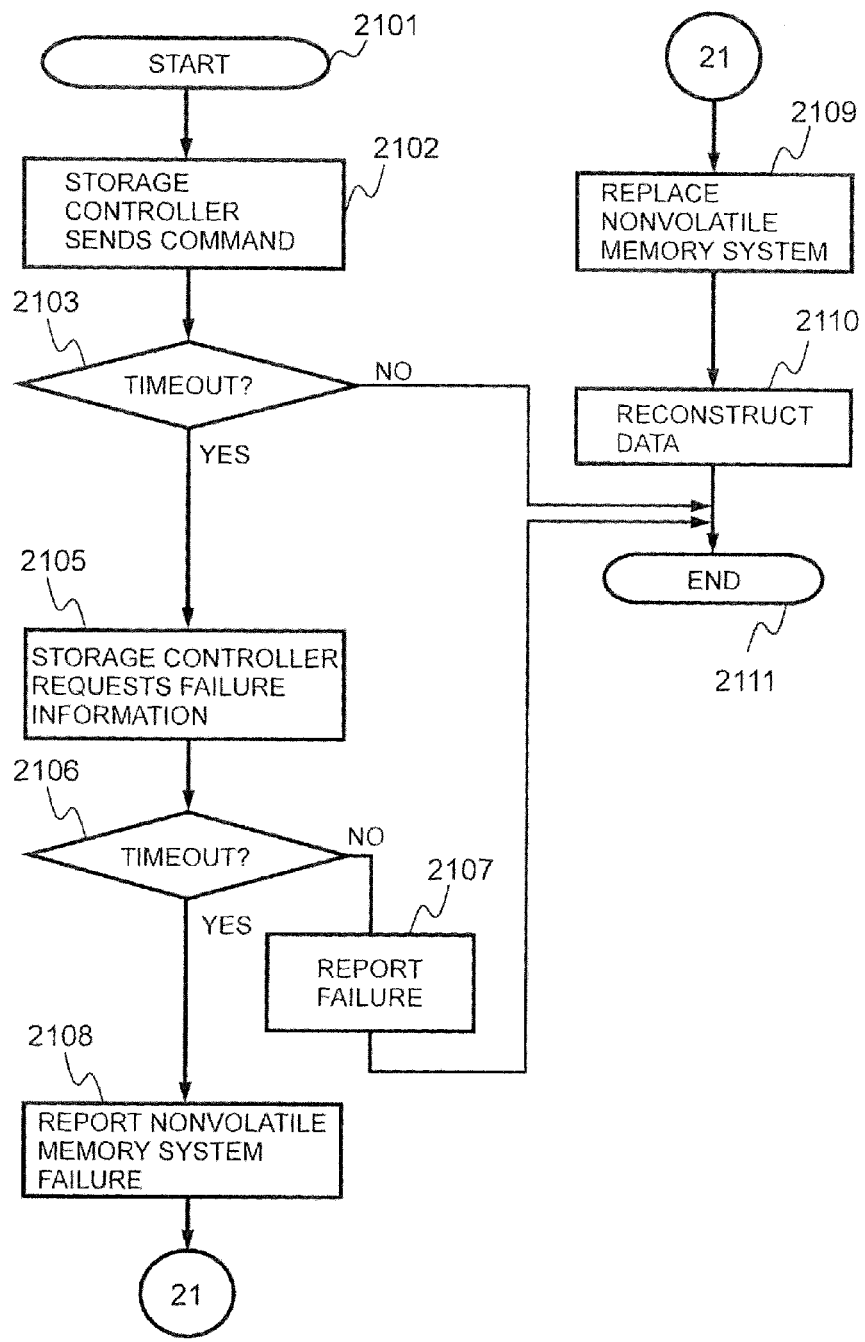
FIG. 21 is a flowchart showing an example of the flow of processing comprising a second failure process related to the fifth example.

FIG. 21 is a flowchart showing an example of the flow of processing comprising the second failure process.

(Step 2101) Processing starts.

(Step 2102) The storage controller 1903 sends a command (for example, either a second read command or a second write command) to the nonvolatile memory system 101.

(Step 2103) The storage controller 1903 compares the elapsed time (first response wait time hereinafter) from when the command was sent to the nonvolatile memory system 101 until a response was received from this system 101 with the response time threshold, and determines whether or not the first response wait time has exceeded the response time threshold. In this example, the fact that the response wait time has exceeded the response time threshold is referred to as a "timeout". When there is no timeout (when a response is received before the first response wait time runs beyond the response time threshold), the storage controller 1903 ends the processing.

(Step 2105) In a case where the first response wait time has exceeded the response time threshold, the storage controller 1903 determines that some sort of failure has occurred in the nonvolatile memory system 101 that was the target of the command of Step 2102 (the target memory system hereinafter). Then, the storage controller 1903 sends a failure information request to the target memory system 101. This step may be the same as Step 2007.

(Step 2106) The storage controller 1903 determines whether or not the elapsed time (second response wait time hereinafter) from when the failure information request of Step 2105 was sent until a response was received from the target memory system 101 exceeded the response time threshold. The threshold, which is compared to the second response wait time, and the threshold, which is compared to the first response wait time, may be the same or may differ.

(Step 2107) When there is no timeout (when a response is received before the second response wait time runs beyond the response time threshold), the storage controller 1903 sends the failure information from the target memory system 101 to the notification-destination computer.

(Step 2108) In a case where the second response wait time has exceeded the response time threshold (for example, a case in which the target memory system 101 has not responded to the failure information request), the storage controller 1903 reports to the notification-destination computer that the target memory system 101 has failed.

(Step 2109) The user of the notification-destination computer that received the report replaces the target memory system 101 with a new nonvolatile memory system 101.

(Step 2110) This step is the same as Step 2010.

A first and a second failure process have been explained hereinabove, and these failure processes can be performed when the nonvolatile memory system 101 executes a command from the storage controller 1903. The nonvolatile memory system 101 migrates data internally even when a command has not been received from the storage controller 1903. That is, a data read from a page occurs even without receiving a command. In a case where a failure that makes error correction impossible is detected at this time, the nonvolatile memory controller 103 may send the "Reporting Information Exception" to the storage controller 1903 the same as was explained using FIG. 12.

Furthermore, Steps 2006 and 2007 in FIG. 20 may be omitted. In accordance with this, the presence or absence of a free physical area (for example, a block 111) may be reported from the defective memory system 101 to the storage controller 1903 in Step 2005.

(Step 2008) Storage controller 1903 judges whether the defective memory system 101 has a free physical area or not.

In this example, the storage controller 1903 lies between the host 1901 and the non-volatile memory system 101. However, a storage controller 1903 that is capable of controlling a large number of nonvolatile memory systems 101 may be integrated with the host 1901.

Numerous examples have been explained hereinabove, but the present invention is not limited to these examples. For example, the flash memory may be a type of flash memory other than a NAND-type flash memory.

| Reference Signs List | |
|---|---|
| 101 | Nonvolatile memory system |
| 102 | Nonvolatile memory |
| 103 | Nonvolatile memory controller |
| 107 | Error correcting code circuit |
| 108 | Bit error probability storage part |
| 109 | Coding circuit |
| 110 | Decoding circuit |

The invention claimed is:

1. A nonvolatile storage system, comprising:
multiple nonvolatile storage media; and
at least one media controller, which is coupled to the multiple nonvolatile storage media,
wherein the media controller includes:
  a storage area configured to store management information, which includes probability management information denoting error probability information of a unit physical area of each of the multiple nonvolatile storage media; and
  an error correcting circuit configured to perform coding and decoding by a low density parity check code,
wherein the error probability is a probability that data within the unit physical area are incorrect, and is a prior probability or a number of corrected bits per data size when the data stored in the unit physical area are read in past time, and
wherein the media controller is configured to, in a data read process:
(A) read data from a read-source physical area in a read-source nonvolatile storage medium;
(B) identify from the management information an error probability, which is the error probability of a unit physical area including the read-source physical area and is better suited to a state of the read source in the current read process than the error probability identified for the same unit physical area in a past read process; and
(C) use the error probability identified in (B) to correct the data read in (A) using the error correcting circuit;
and further comprising:
multiple nonvolatile storage devices configuring a RAID group; and
a storage controller, which is coupled to the multiple nonvolatile storage devices,
wherein each of the multiple nonvolatile storage devices has one of the multiple nonvolatile storage media and the media controller,
wherein the storage controller is coupled to multiple media controllers in the multiple nonvolatile storage devices, and
wherein
(a) a read-source nonvolatile storage device is configured to detect that correcting the data in (C) has failed and there is an error that cannot be corrected, wherein the read-source nonvolatile storage device among the multiple nonvolatile storage devices is a read-source of the data read in (A), and wherein a read-source media controller is the media controller in the read-source nonvolatile storage device,
(b) wherein the read-source media controller is configured to send failure occurrence information denoting that a failure has occurred to the storage controller,
(c) wherein the read-source media controller is configured to send free information denoting whether or not there is a free physical area in the one of the multiple nonvolatile storage media in the read-source nonvolatile storage device to the storage controller, (d) the storage controller is configured to receive the free information, (e) the storage controller is configured to determine whether or not the free information denotes the existence of the free physical area, and (f) in a case where the result of the determination in (e) is affirmative, the storage controller is configured to read data from nonvolatile storage devices in the RAID group other than the read-source nonvolatile storage device, construct data stored in the read-source nonvolatile storage device based on the data that have been read, and send the constructed data to the read-source nonvolatile storage device, in accordance with which the constructed data are stored in the free physical area of the read-source nonvolatile storage device;

wherein the storage controller is configured to, upon receiving the failure occurrence information, send a failure information request to the read-source nonvolatile storage device, the read-source nonvolatile storage device is configured to, in response to this request, send failure information and the free information to the storage controller so that the storage controller is able to receive the failure information and the free information in (d), and the failure information includes information denoting the read-source nonvolatile storage medium of the data with the uncorrectable error.

2. A nonvolatile storage system according to claim 1, wherein the nonvolatile storage device is a nonvolatile memory device, the nonvolatile storage medium is an m-value multilevel cell flash memory, each flash memory is configured from multiple blocks, each of the blocks is configured from multiple pages, the unit physical area corresponds to a page of a flash memory and a physical area corresponds a block of a flash memory, the probability management information denotes error probability information for each set of pages for each flash memory, and the set of pages is a set of pages for which the remainders obtained by dividing the page numbers by m are identical.

3. A nonvolatile storage system according to claim 2, wherein the error probability information is a value denoting an error probability, the read-source controller is configured to, in a data read process:

(D) compute an error probability corresponding to a set of pages, which includes the read-source page, by dividing the number of bits corrected in (C) by the size of the data that have been read in (A); and (E) write the error probability computed in (D) to the probability management information as the error probability corresponding to the set of pages that includes the read-source page, and the error probability identified in (B) in a next data read process, for which the same set of pages as the read-source set of pages is the read source, constitutes the error probability that is suited to the state of the read-source set of pages in the next data read process.

4. A nonvolatile storage system according to claim 2, wherein the probability management information includes a last data writing time, which is the time at which the data have been last written, and a time-dependent parameter, which is a parameter that depends on time, for each set of pages, the error probability information is the time-dependent parameter, the read-source media controller is configured to, in a case where data have been written to a page, write the time at which the data have been written to the page in the probability management information as a last data writing time corresponding to the set of pages that includes the programming-destination page, the read-source media controller is configured to, in (B) of the data read process, identify on a basis of the management information the last data writing time and the time-dependent parameter corresponding to the set of pages that includes the read-source page, compute an elapsed time from the identified last data writing time to the read time, which is the time of the data read process, and compute the error probability corresponding to the set of pages that includes the read-source page by using the identified time-dependent parameter and the computed elapsed time, and the read-source media controller is configured to, in the data read process:

(D) compute the error probability corresponding to the set of pages that includes the read-source page by dividing the number of bits corrected in (C) by the size of the data that has been read in (A); and (E) use the error probability computed in (B), the error probability computed in (D), the last data writing time used in (B), and the read time used in (B) to compute the time-dependent parameter corresponding to the set of pages that includes the read-source page, and write the computed time-dependent parameter to the probability management information as the time-dependent parameter corresponding to the set of pages that includes the read-source page, and the error probability identified in (B) in a next data read process, for which the same set of pages as the read-source set of pages is the read source, constitutes the error probability that is suited to the state of the read-source set of pages in the next data read process.

5. A nonvolatile storage system according to claim 1, wherein the probability management information includes an error probability for each combination of one or more types of parameters, which have an impact on the error probability, the read-source media controller is configured to, in (B), identify the error probability corresponding to a value of the one or more types of parameters in the data read process, and the error probability identified in (B) of the current data read process constitutes the error probability that is better suited to the read-source page than the error probability identified in (B) of a past data read process in which the same page as the read source page is the read source.

6. A nonvolatile storage system according to claim 5, wherein the one or more types of parameters is one or more types from among the number of data writing and/or the number of data erases for each block, the number of data reads for each block, the last data writing time for each block, and the temperature of the flash memory.

7. A nonvolatile storage system according to claim 1, wherein
the error probability information is a value denoting an error probability,
the media controller is configured to, in a data read process:
(D) compute the error probability corresponding to the unit physical area including the read-source physical area by dividing the number of bits corrected in (C) by the size of the data read in (A); and
(E) write the error probability computed in (D) to the probability management information as the error probability corresponding to the unit physical area including the read-source physical area, and
the error probability identified in (B) in a next data read process for which the same unit physical area as the read-source unit physical area is the read source, constitutes the error probability that is suited to state of the read-source physical area of the next data read process.

8. A nonvolatile storage system according to claim 7, wherein
the nonvolatile storage device is a nonvolatile memory device,
the nonvolatile storage medium is an m-value multilevel cell flash memory,
each flash memory is configured from multiple blocks,
each of the blocks is configured from multiple pages,
the unit physical area corresponds to a page of a flash memory and a physical area corresponds a block of a flash memory,
the probability management information denotes error probability information for each set of pages for each flash memory, and
the set of pages is a set of pages for which the remainders obtained by dividing the page numbers by m are identical.

9. A nonvolatile storage system according to claim 1, wherein
the probability management information includes a last data writing time, which is the time at which the data have been last written, and a time-dependent parameter, which is a parameter that depends on time, for unit physical area,
the error probability information is the time-dependent parameter,
the media controller is configured to, in a case where data has been written to a physical area, write the time at which this data has been written to the physical area in the probability management information as the last data writing time corresponding to the unit physical area that includes the writing-destination physical area,
the media controller is configured to, in (B) of the data read process, identify on a basis of the management information the last data writing time and the time-dependent parameter corresponding to the unit physical area that includes the read-source physical area, compute the elapsed time from the identified last data writing time to the read time, which is the time of the data read process, and compute the error probability corresponding to the read-source unit physical area by using the identified time-dependent parameter and the computed elapsed time, and the media controller is configured to, in the data read process:
(D) compute the error probability corresponding to the read-source unit physical area by dividing the number of bits corrected in (C) by the size of the data that have been read in (A); and
(E) use the error probability computed in (B), the error probability computed in (D), the last data writing time used in (B), and the read time used in (B) to compute the time-dependent parameter corresponding to the set of pages that includes the read-source page, and write the computed time-dependent parameter to the probability management information as the time-dependent parameter corresponding to the read-source unit physical area, and
the error probability computed in (B) in a next data read process, for which the same unit physical area as the read-source unit physical area is the read source, constitutes the error probability that is suited to the state of the read-source unit physical area in the next data read process.

10. A nonvolatile storage system according to claim 9, wherein the nonvolatile storage device is a nonvolatile memory device,
the nonvolatile storage medium is an m-value multilevel cell flash memory,
each flash memory is configured from multiple blocks,
each of the blocks is configured from multiple pages,
the unit physical area corresponds to a page of a flash memory and a physical area corresponds a block of a flash memory,
the probability management information denotes error probability information for each set of pages for each flash memory, and
the set of pages is a set of pages for which the remainders obtained by dividing the page numbers by m are identical.

11. A nonvolatile storage system according to claim 1, wherein the probability management information includes an error probability for each combination of one or more types of parameters, which have an impact on the error probability,
the media controller is configured to, in (B), identify the error probability corresponding to a value of the one or more types of parameters in the data read process, and
the error probability identified in (B) of this data read process constitutes the error probability that is better suited to the read-source unit physical area than the error probability identified in (B) of a past data read process in which the same unit physical area as the read source unit physical area is the read source.

12. A nonvolatile storage system according to claim 1, wherein the media controller is configured to detect that correcting the data in (C) has failed and there is an error that cannot be corrected, and to output failure information, and
the failure information includes information denoting the read-source nonvolatile storage medium with the uncorrectable-error data.

* * * * *